United States Patent
Kumar et al.

(10) Patent No.: US 12,245,222 B2
(45) Date of Patent: Mar. 4, 2025

(54) TECHNIQUES FOR SKIPPING SCHEDULING REQUESTS

(71) Applicant: QUALCOMM Incorporated, San Diego, CA (US)

(72) Inventors: Akshay Kumar, San Diego, CA (US); Arnaud Meylan, San Diego, CA (US); Avinash Manda, San Diego, CA (US); Zhibin Dang, San Diego, CA (US); Krishna Chaitanya Mukkera, San Diego, CA (US); Michel Chauvin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/568,495

(22) Filed: Jan. 4, 2022

(65) Prior Publication Data
US 2023/0217430 A1    Jul. 6, 2023

(51) Int. Cl.
*H04W 72/12*    (2023.01)
*H04W 24/08*    (2009.01)
*H04W 72/1268*    (2023.01)
*H04W 72/14*    (2009.01)
(Continued)

(52) U.S. Cl.
CPC ....... *H04W 72/1268* (2013.01); *H04W 24/08* (2013.01); *H04W 72/20* (2023.01); *H04W 72/23* (2023.01)

(58) Field of Classification Search
CPC . H04W 72/1268; H04W 24/08; H04W 72/20; H04W 72/23; H04W 72/21
See application file for complete search history.

(56) References Cited

U.S. PATENT DOCUMENTS

2017/0208619 A1*    7/2017    Yang ..................... H04W 72/21
2021/0376985 A1    12/2021    Zhou et al.
(Continued)

FOREIGN PATENT DOCUMENTS

EP    3713360 A1    9/2020

OTHER PUBLICATIONS

Partial International Search Report—PCT/US2022/049840—ISA/EPO—Feb. 22, 2023.
(Continued)

*Primary Examiner* — Abdullahi E Salad
(74) *Attorney, Agent, or Firm* — Holland & Hart LLP

(57) ABSTRACT

Methods, systems, and devices for wireless communications are described. A user equipment (UE) may identify that uplink data is available for transmission at the UE prior to a scheduling request occasion. The UE may skip transmission of a scheduling request during the scheduling request occasion based on identifying that an uplink grant is pending. The UE may transmit at least a portion of the uplink data to a base station using a resource allocation indicated by the uplink grant. Alternatively, the UE may transmit the scheduling request to the base station during a first scheduling request occasion. The UE may initiate a retransmission timer based on transmitting the scheduling request. Accordingly, the UE may skip retransmission of the scheduling request during a second scheduling request occasion that is subsequent to the first scheduling request occasion based on the retransmission timer.

25 Claims, 15 Drawing Sheets

(51) Int. Cl.
  *H04W 72/20*  (2023.01)
  *H04W 72/23*  (2023.01)

(56) References Cited

U.S. PATENT DOCUMENTS

2022/0191909 A1* 6/2022 Zou ..................... H04W 72/21
2023/0239857 A1* 7/2023 Lee ................... H04W 28/0278
                                                    370/329

OTHER PUBLICATIONS

International Search Report and Written Opinion—PCT/US2022/049840—ISA/EPO—Apr. 14, 2023.

* cited by examiner

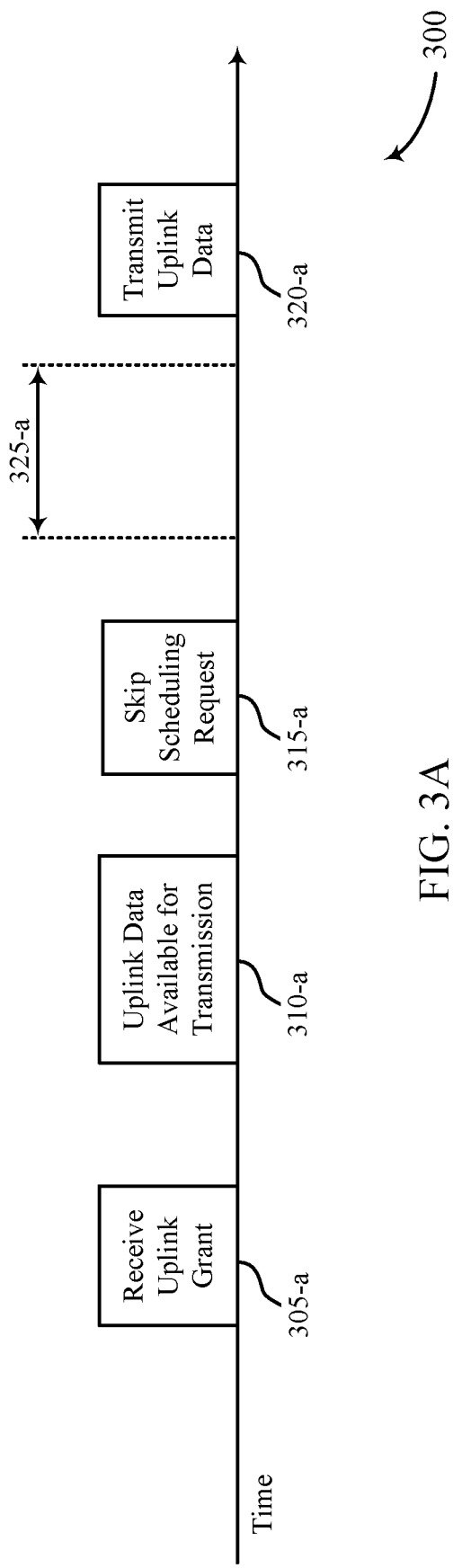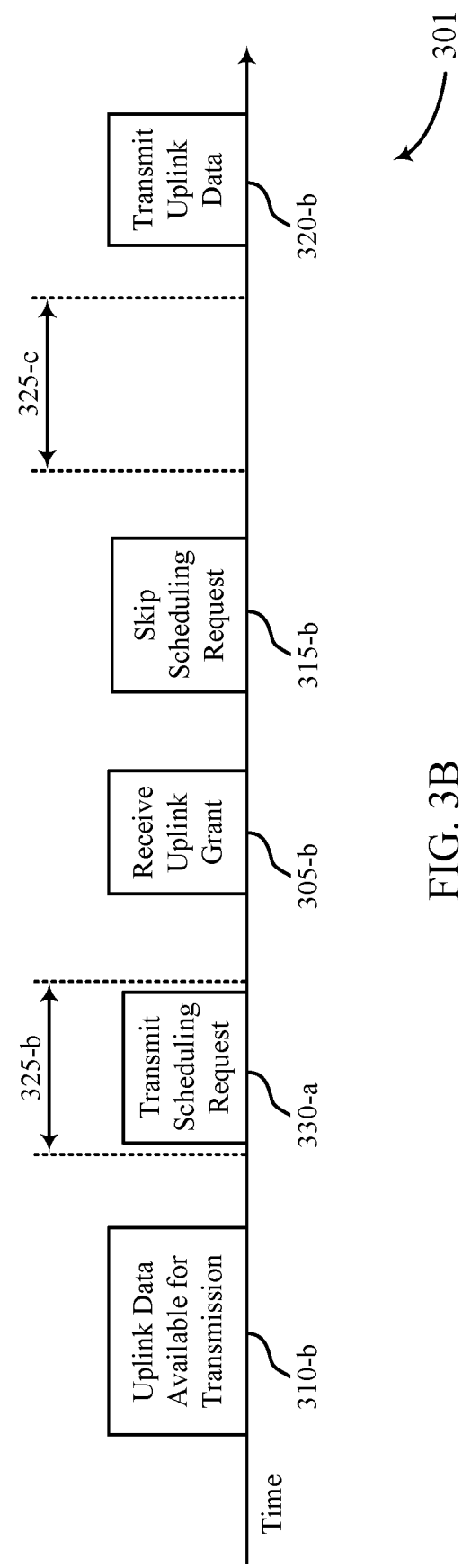
FIG. 3A
FIG. 3B

TECHNIQUES FOR SKIPPING SCHEDULING REQUESTS

FIELD OF TECHNOLOGY

The following relates to wireless communications, including techniques for skipping scheduling requests.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may transmit a scheduling request to a base station when the UE has uplink data available for transmission. In some cases, however, the UE may receive a pending uplink grant from the base station prior to the uplink data becoming available for transmission. In such cases, transmitting the scheduling request (e.g., when the UE already has access to available resources) may result in higher signaling overhead and increased power consumption at the UE.

SUMMARY

The described techniques relate to improved methods, systems, devices, and apparatuses that support techniques for skipping scheduling requests. Generally, the described techniques provide for configuring a user equipment (UE) to skip a scheduling request in response to various conditions. In some examples, a UE may identify that uplink data is available for transmission at the UE prior to a scheduling request occasion. The UE may skip transmission of a scheduling request during the scheduling request occasion based on identifying that an uplink grant is pending. The UE may transmit at least a portion of the uplink data to a base station using a resource allocation indicated by the uplink grant. In other examples, the UE may transmit the scheduling request to the base station during a first scheduling request occasion. The UE may initiate a scheduling request retransmission timer based on transmitting the scheduling request to the base station during the first scheduling request occasion. A duration of the scheduling request retransmission timer may be based on one or more of an observed network response delay, a scheduling request prohibit timer of the UE having a value that is below a threshold, or a scheduling request occasion configuration of the UE omitting a value for the scheduling request prohibit timer. The UE may skip retransmission of the scheduling request during a second scheduling request occasion that is subsequent to the first scheduling request occasion based on the scheduling request retransmission timer.

A method for wireless communications at a UE is described. The method may include identifying that uplink data is available for transmission at the UE prior to a scheduling request occasion, skipping, during the scheduling request occasion, transmission of a scheduling request for requesting resources to use for transmission of the uplink data based on identifying that an uplink grant is pending, and transmitting, to a base station, at least a portion of the uplink data using a resource allocation indicated by the uplink grant.

An apparatus for wireless communications at a UE is described. The apparatus may include a processor, memory coupled with the processor, and instructions stored in the memory. The instructions may be executable by the processor to cause the apparatus to identify that uplink data is available for transmission at the UE prior to a scheduling request occasion, skip, during the scheduling request occasion, transmission of a scheduling request for requesting resources to use for transmission of the uplink data based on identifying that an uplink grant is pending, and transmit, to a base station, at least a portion of the uplink data using a resource allocation indicated by the uplink grant.

Another apparatus for wireless communications at a UE is described. The apparatus may include means for identifying that uplink data is available for transmission at the UE prior to a scheduling request occasion, means for skipping, during the scheduling request occasion, transmission of a scheduling request for requesting resources to use for transmission of the uplink data based on identifying that an uplink grant is pending, and means for transmitting, to a base station, at least a portion of the uplink data using a resource allocation indicated by the uplink grant.

A non-transitory computer-readable medium storing code for wireless communications at a UE is described. The code may include instructions executable by a processor to identify that uplink data is available for transmission at the UE prior to a scheduling request occasion, skip, during the scheduling request occasion, transmission of a scheduling request for requesting resources to use for transmission of the uplink data based on identifying that an uplink grant is pending, and transmit, to a base station, at least a portion of the uplink data using a resource allocation indicated by the uplink grant.

In some examples of the method, apparatuses, and non-transitory computer-readable medium described herein, transmitting at least the portion of the uplink data may include operations, features, means, or instructions for transmitting at least the portion of the uplink data to the base station using the resource allocation indicated by the uplink grant that occurs subsequent to the scheduling request occasion.

Some examples of the method, apparatuses, and non-transitory computer-readable medium described herein may further include operations, features, means, or instructions for triggering the scheduling request based on identifying that the uplink data may be available for transmission, receiving the uplink grant from the base station after triggering the scheduling request and before the scheduling request occasion, and canceling the scheduling request based on receiving the uplink grant.

Some examples of the method, apparatuses, and non-transitory computer-readable medium described herein may further include operations, features, means, or instructions for transmitting an initial scheduling request to the base station during a scheduling request occasion that occurs prior to the scheduling request occasion based on identifying that the uplink data may be available for transmission at the UE and receiving the uplink grant from the base station in response to transmitting the initial scheduling request, where skipping transmission of the scheduling request may be based on receiving the uplink grant from the base station.

Some examples of the method, apparatuses, and non-transitory computer-readable medium described herein may further include operations, features, means, or instructions for receiving, from the base station and prior to the scheduling request occasion, prescheduled downlink control information (DCI) indicating the uplink grant that provides a physical uplink shared channel (PUSCH) resource allocation for transmission of the uplink data, where the PUSCH resource allocation may be subsequent to the scheduling request occasion.

Some examples of the method, apparatuses, and non-transitory computer-readable medium described herein may further include operations, features, means, or instructions for receiving, from the base station, DCI indicating the uplink grant, where skipping transmission of the scheduling request may be based on receiving the DCI from the base station.

Some examples of the method, apparatuses, and non-transitory computer-readable medium described herein may further include operations, features, means, or instructions for receiving, from the base station, the uplink grant indicating a set of PUSCH resources allocated for transmission of the uplink data.

Some examples of the method, apparatuses, and non-transitory computer-readable medium described herein may further include operations, features, means, or instructions for receiving a second uplink grant from the base station and transmitting a remainder of the uplink data to the base station on a second resource allocation indicated by the second uplink grant.

In some examples of the method, apparatuses, and non-transitory computer-readable medium described herein, skipping transmission of the scheduling request may include operations, features, means, or instructions for skipping transmission of the scheduling request during the scheduling request occasion based on a determination that prescheduling may be activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof.

Some examples of the method, apparatuses, and non-transitory computer-readable medium described herein may further include operations, features, means, or instructions for determining that a summation of the delay between scheduling request transmission and uplink grant reception and a difference between the first time and the second time may be greater than a difference between the third time and the first time, where skipping transmission of the scheduling request may be based on the determining.

A method for wireless communications at a UE is described. The method may include transmitting, to a base station during a first scheduling request occasion, a scheduling request for requesting a grant that provides a resource allocation for uplink transmission, initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer, and skipping retransmission of the scheduling request during a second scheduling request occasion that is subsequent to the first scheduling request occasion based on the scheduling request retransmission timer.

An apparatus for wireless communications at a UE is described. The apparatus may include a processor, memory coupled with the processor, and instructions stored in the memory. The instructions may be executable by the processor to cause the apparatus to transmit, to a base station during a first scheduling request occasion, a scheduling request for requesting a grant that provides a resource allocation for uplink transmission, initiate a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer, and skip retransmission of the scheduling request during a second scheduling request occasion that is subsequent to the first scheduling request occasion based on the scheduling request retransmission timer.

Another apparatus for wireless communications at a UE is described. The apparatus may include means for transmitting, to a base station during a first scheduling request occasion, a scheduling request for requesting a grant that provides a resource allocation for uplink transmission, means for initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer, and means for skipping retransmission of the scheduling request during a second scheduling request occasion that is subsequent to the first scheduling request occasion based on the scheduling request retransmission timer.

A non-transitory computer-readable medium storing code for wireless communications at a UE is described. The code may include instructions executable by a processor to transmit, to a base station during a first scheduling request occasion, a scheduling request for requesting a grant that provides a resource allocation for uplink transmission, initiate a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer, and skip retransmission of the scheduling request during a second scheduling request occasion that is subsequent to the first scheduling request occasion based on the scheduling request retransmission timer.

Some examples of the method, apparatuses, and non-transitory computer-readable medium described herein may further include operations, features, means, or instructions for receiving control signaling indicating the scheduling request occasion configuration, where the duration of the scheduling request retransmission timer may be set based on the scheduling request occasion configuration omitting a value for the scheduling request prohibit timer that allows the base station to respond to the scheduling request.

Some examples of the method, apparatuses, and non-transitory computer-readable medium described herein may further include operations, features, means, or instructions for determining the duration of the scheduling request retransmission timer based on one or both of a scheduling request occasion periodicity of the base station or the observed network response delay that may be a minimum network response delay observed by the UE of the base station responding to one or more prior scheduling requests, where skipping retransmission of the scheduling request may be based on determining the duration of the scheduling request retransmission timer.

Some examples of the method, apparatuses, and non-transitory computer-readable medium described herein may further include operations, features, means, or instructions for receiving the grant based on transmitting the scheduling request during the first scheduling request occasion and transmitting one or both of a buffer status report or uplink data using the resource allocation provided by the grant.

In some examples of the method, apparatuses, and non-transitory computer-readable medium described herein, transmitting the scheduling request during the first scheduling request occasion may include operations, features, means, or instructions for transmitting the scheduling request on one or more physical uplink control channel (PUCCH) resources during the first scheduling request occasion.

In some examples of the method, apparatuses, and non-transitory computer-readable medium described herein, skipping retransmission of the scheduling request may include operations, features, means, or instructions for skipping retransmission of the scheduling request during the second scheduling request occasion based on an available exposure budget for PUCCH transmissions and PUSCH transmissions from the UE.

BRIEF DESCRIPTION OF THE DRAWINGS

FIGS. 3A, 3B, and 3C illustrate examples of communication timelines that support techniques for skipping scheduling requests in accordance with aspects of the present disclosure.

DETAILED DESCRIPTION

Figure 1:
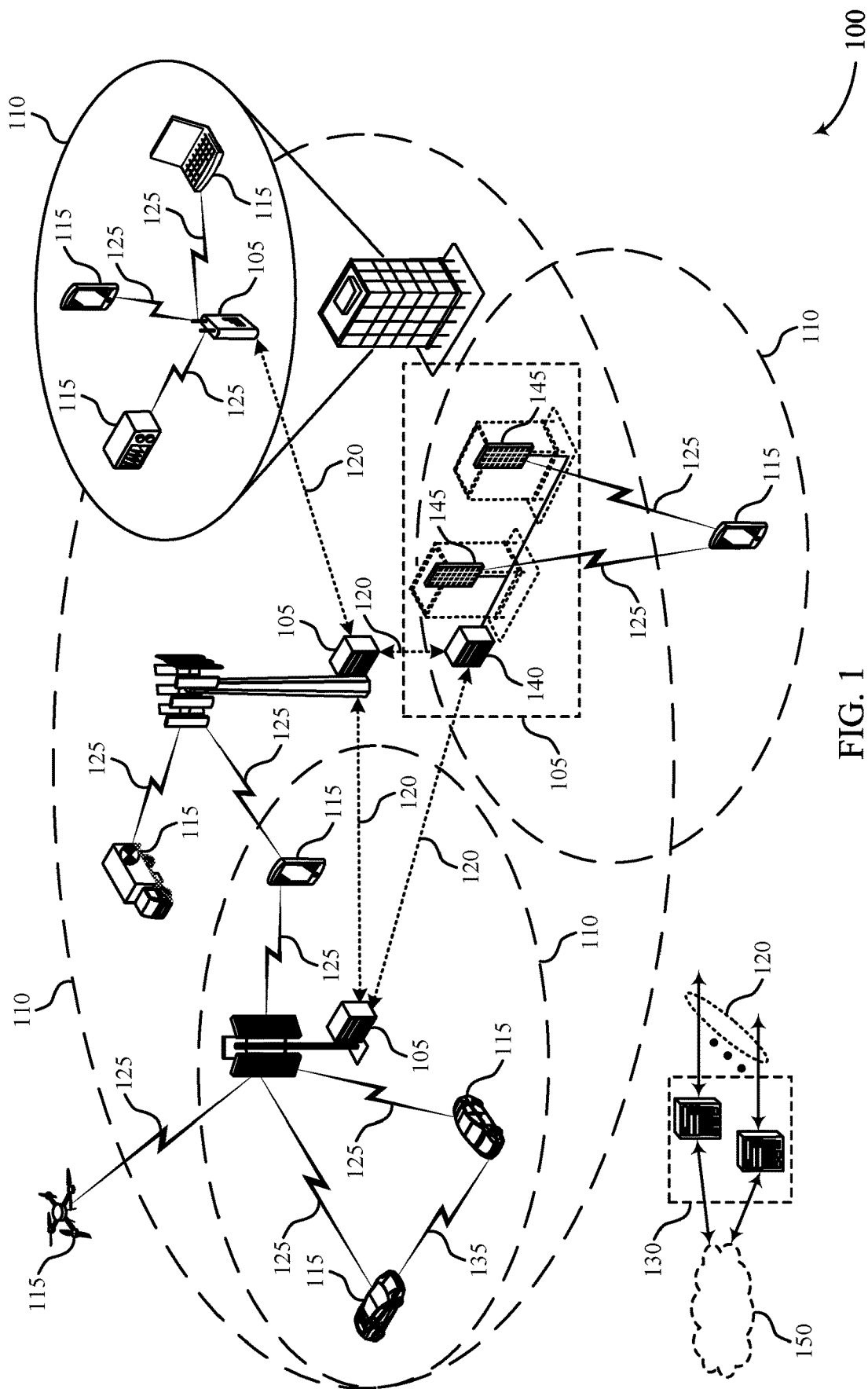
FIGS. 1 and 2 illustrate examples of wireless communications systems that support techniques for skipping scheduling requests in accordance with aspects of the present disclosure.

In some wireless communications systems, if a user equipment (UE) has uplink data to transmit and there are no physical uplink shared channel (PUSCH) resources available for transmission of the uplink data, the UE may transmit a scheduling request to a base station during a scheduling request occasion. In response to the scheduling request, the base station may transmit an uplink grant to the UE such that the UE can transmit some or all of the uplink data to the base station on PUSCH resources indicated by the uplink grant.

In some cases, however, the base station may transmit a pending (e.g., prescheduled, preconfigured) uplink grant to the UE prior to the scheduling request occasion. The pending uplink grant may indicate PUSCH resources that the UE can use for subsequent uplink transmissions. If, for example, the PUSCH resources indicated by the pending uplink grant are subsequent to the scheduling request occasion, the UE may still transmit the scheduling request to the base station (e.g., even though the UE has available PUSCH resources). Transmitting a scheduling request when the UE has already received a pending uplink grant may result in higher signaling overhead and greater power consumption at the UE.

Aspects of the present disclosure provide for configuring a UE to cancel a scheduling request when the UE has a pending uplink grant. For example, if the UE triggers a scheduling request (e.g., due to uplink data becoming available for transmission) but the UE receives a pending uplink grant prior to transmitting the scheduling request, the UE may cancel transmission of the scheduling request, and may instead transmit the uplink data on PUSCH resources indicated by the pending uplink grant. Canceling the scheduling request may result in decreased signaling overhead and lower power consumption at the UE, among other benefits.

The techniques described herein may also provide for configuring the UE to refrain from retransmitting a scheduling request for a predetermined amount of time (e.g., after initially transmitting the scheduling request). For example, if the UE determines that it will take a network entity (e.g., a base station) at least 5 milliseconds (ms) to respond to a scheduling request, the UE may refrain from retransmitting the scheduling request for at least 5 ms after initially transmitting the scheduling request (e.g., to account for network response delays). If the UE has not received an uplink grant by this time, the UE may determine whether to retransmit the scheduling request in the next scheduling request occasion. By accounting for network response delays, the UE may avoid extraneous retransmissions and attain greater power savings.

Aspects of the present disclosure may be implemented to realize one or more of the following advantages. The described techniques may provide for reduced power consumption and lower signaling overhead at a UE. For example, the techniques described herein may enable a UE to refrain from transmitting or retransmitting a scheduling request if specific conditions are met (e.g., if the UE has access to a pending uplink grant, if a retransmission timer of the UE is active). Reducing the number of scheduling requests transmitted by the UE may result in lower signaling overhead and decreased power consumption at the UE, among other benefits.

Aspects of the disclosure are initially described in the context of wireless communications systems, communication timelines, and process flows. Aspects of the disclosure are further illustrated by and described with reference to apparatus diagrams, system diagrams, and flowcharts that relate to techniques for skipping scheduling requests.

FIG. 1 illustrates an example of a wireless communications system 100 that supports techniques for skipping scheduling requests in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary or mobile at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with one or both of the core network 130 or with one another. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130). In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying one or both of amplitude offsets or phase offsets to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques and error correction techniques to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may determine whether to trigger a scheduling request based on various constraints. As an example, uplink data arrival may result in a regular uplink buffer status report trigger. If, for example, a regular buffer status report is triggered and there are no PUSCH resources available, the UE 115 may trigger a scheduling request. The scheduling request may be canceled if the UE 115 builds (e.g., generates) the PUSCH with a buffer status report MAC-CE before the next scheduling request occasion.

In some examples, if a buffer status reporting procedure determines that at least one buffer status report has been triggered and not canceled and that uplink shared channel resources are available for a new transmission and that the uplink shared channel resources can accommodate the buffer status report MAC-CE and corresponding sub-header as a result of logical channel prioritization, the UE 115 may instruct a multiplexing and assembly procedure to generate the buffer status report MAC-CE in accordance with various regulations. Alternatively, or additionally, the UE 115 may start or restart a periodic buffer status report timer (e.g., periodicBSR-Timer), except when all the generated buffer status reports are long or short truncated buffer status reports. In other examples, the UE 115 may start or restart a buffer status report retransmission timer (e.g., relxBSR-Timer).

If, for example, a regular buffer status report has been triggered and a logical channel scheduling request delay timer (e.g., logicalChannelSR-DelayTimer) is not running and there are no uplink shared channel resources available for a new transmission or the UE 115 is configured with a configured uplink grant and the regular buffer status report was triggered for a logical channel for which a logical channel scheduling request mask (e.g., logicalChannelSR-Mask) is set to a specific value (e.g., false) or the uplink shared channel resources available for a new transmission do not meet logical channel prioritization (LCP) mapping constraints configured for the logical channel that triggered the buffer status report, the UE 115 may trigger a scheduling request.

In accordance with aspects of the present disclosure, a UE 115 may cancel or skip a scheduling request during a scheduling request occasion when the UE 115 has a pending uplink grant, even if resources allocated by the scheduling request are subsequent to the scheduling request occasion.

For example, if the UE 115 triggers a scheduling request (e.g., due to uplink data becoming available for transmission) but the UE 115 receives a pending uplink grant prior to transmitting the scheduling request, the UE 115 may cancel transmission of the scheduling request, and may instead transmit the uplink data on PUSCH resources indicated by the pending uplink grant. Canceling the scheduling request may result in decreased signaling overhead and lower power consumption at the UE 115, among other benefits.

The techniques described herein may also provide for configuring a UE 115 to refrain from retransmitting a scheduling request for a predetermined amount of time (e.g., after initially transmitting the scheduling request). For example, if a UE 115 determines that it will take a network entity (e.g., a base station 105) at least 5 milliseconds (ms) to respond to a scheduling request, the UE 115 may refrain from retransmitting the scheduling request for at least 5 ms after initially transmitting the scheduling request (e.g., to account for network response delays). If the UE 115 has not received an uplink grant by this time, the UE 115 may determine whether to retransmit the scheduling request in an upcoming scheduling request occasion. By accounting for network response delays, the UE 115 may avoid extraneous retransmissions and attain greater power savings, among other benefits.

The wireless communications system 100 may support techniques for reduced power consumption and lower signaling overhead at a UE 115, among other benefits. For example, the techniques and operations described in the wireless communications system 100 may enable a UE 115 to cancel one or more scheduling requests if various conditions are met (e.g., if the UE 115 previously received an uplink grant or if a scheduling request retransmission timer of the UE is still active). Configuring a UE 115 to refrain from transmitting one or more scheduling requests in accordance with aspects of the present disclosure may result in lower signaling overhead (e.g., fewer extraneous transmissions) and greater power savings at the UE 115.

Figure 2:
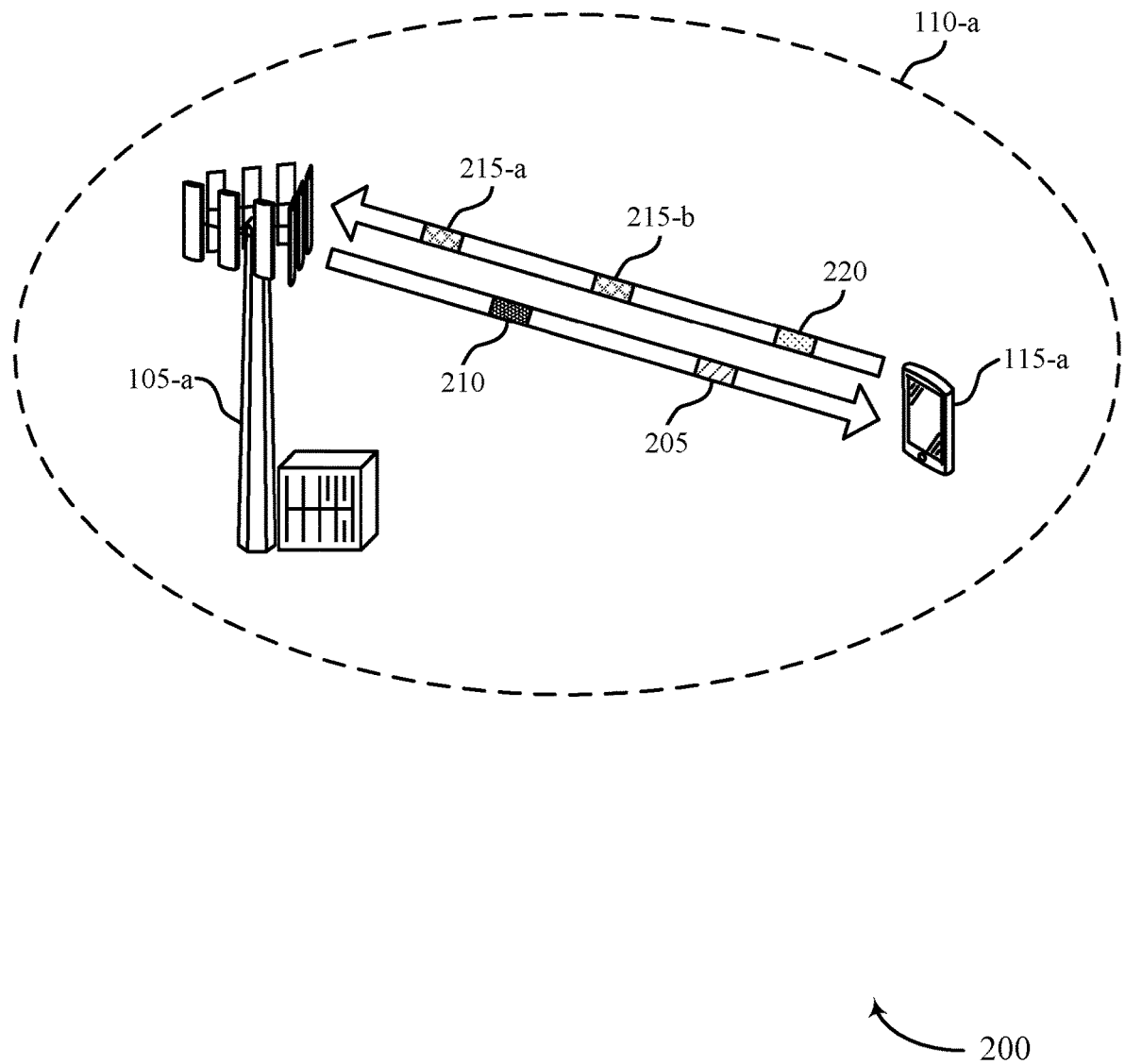

FIG. 2 illustrates an example of a wireless communications system 200 that supports techniques for skipping scheduling requests in accordance with aspects of the present disclosure. The wireless communications system 200 may implement or be implemented by aspects of the wireless communications system 100. For example, the wireless communications system 200 may include a base station 105-*a* and a UE 115-*a*, which may be examples of corresponding devices described with reference to FIG. 1. The base station 105-*a* and the UE 115-*a* may communicate within a geographic coverage area 110-*a*, which may be an example of a geographic coverage area 110 described with reference to FIG. 1. In the wireless communications system 200, the UE 115-*a* may transmit uplink data 220 to the base station 105-*a* on PUSCH resources indicated by an uplink grant 210.

In the example of FIG. 2, the base station 105-*a* may transmit control signaling 205 to the UE 115-*a*. The control signaling 205 may indicate a scheduling request occasion configuration of the base station 105-*a*. In some examples, the scheduling request occasion configuration indicated by the control signaling 205 may include a value for a scheduling request prohibit timer (e.g., sr-Prohibit Timer). In other examples, the scheduling request occasion configuration indicated by the control signaling 205 may omit a value for the scheduling request prohibit timer. The scheduling request prohibit timer may allow the base station 105-*a* to respond to scheduling requests from the UE 115-*a*.

As described herein, the UE 115-*a* may transmit scheduling requests 215 to the base station 105-*a* when the UE 115-*a* has uplink data available for transmission. The UE 115-*a* may determine that there is uplink data available for transmission based on checking an uplink buffer of the UE 115-*a*. In some examples, the UE 115-*a* may receive the uplink grant 210 prior to transmission of the scheduling requests 215. For example, the UE 115-*a* may receive the uplink grant 210 prior to transmitting a scheduling request 215-*a*. In such examples, the UE 115-*a* may skip the scheduling request 215-*a*.

In other examples, the UE 115-*a* may receive the uplink grant 210 in response to the scheduling request 215-*a*. In such examples, the UE 115-*a* may skip transmission of a scheduling request 215-*b* (e.g., a retransmission of the scheduling request 215-*a*). If, for example, the scheduling request occasion configuration indicated by the control signaling 205 omits a value for the scheduling request prohibit timer, the UE 115-*a* may refrain from transmitting one or both of the scheduling requests 215 based on a minimum response time observed by the UE 115-*a* (e.g., the interval between when the UE 115-*a* transmits the scheduling requests 215 and when the UE 115-*a* receives the uplink grant 210).

Accordingly, the UE 115-*a* may transmit at least a portion of the uplink data 220 to the base station 105-*a* on PUSCH resources indicated by the uplink grant 210. Additionally or alternatively, the UE 115-*a* may transmit a buffer status report to the base station 105-*a* using the PUSCH resources indicated by the uplink grant 210. The buffer status report may indicate a quantity of uplink data available for transmission at the UE 115-*a*. In some examples, the UE 115-*a* may receive a second uplink grant from the base station 105-*a* in response to the buffer status report. The UE 115-*a* may transmit a remainder of the uplink data 220 on PUSCH resources indicated by the second uplink grant.

The wireless communications system 200 may support techniques for reduced power consumption and lower signaling overhead at the UE 115-*a*, among other benefits. For example, the techniques and operations described in the wireless communications system 200 may enable the UE 115-*a* to cancel one or both of the scheduling requests 215 if various conditions are met (e.g., if the UE 115-*a* previously received an uplink grant 210 or if a scheduling request retransmission timer of the UE 115-*a* is still active). Canceling one or both of the scheduling requests 215 may result in lower signaling overhead (e.g., fewer extraneous transmissions) and greater power savings at the UE 115-*a*.

Figure 3C:
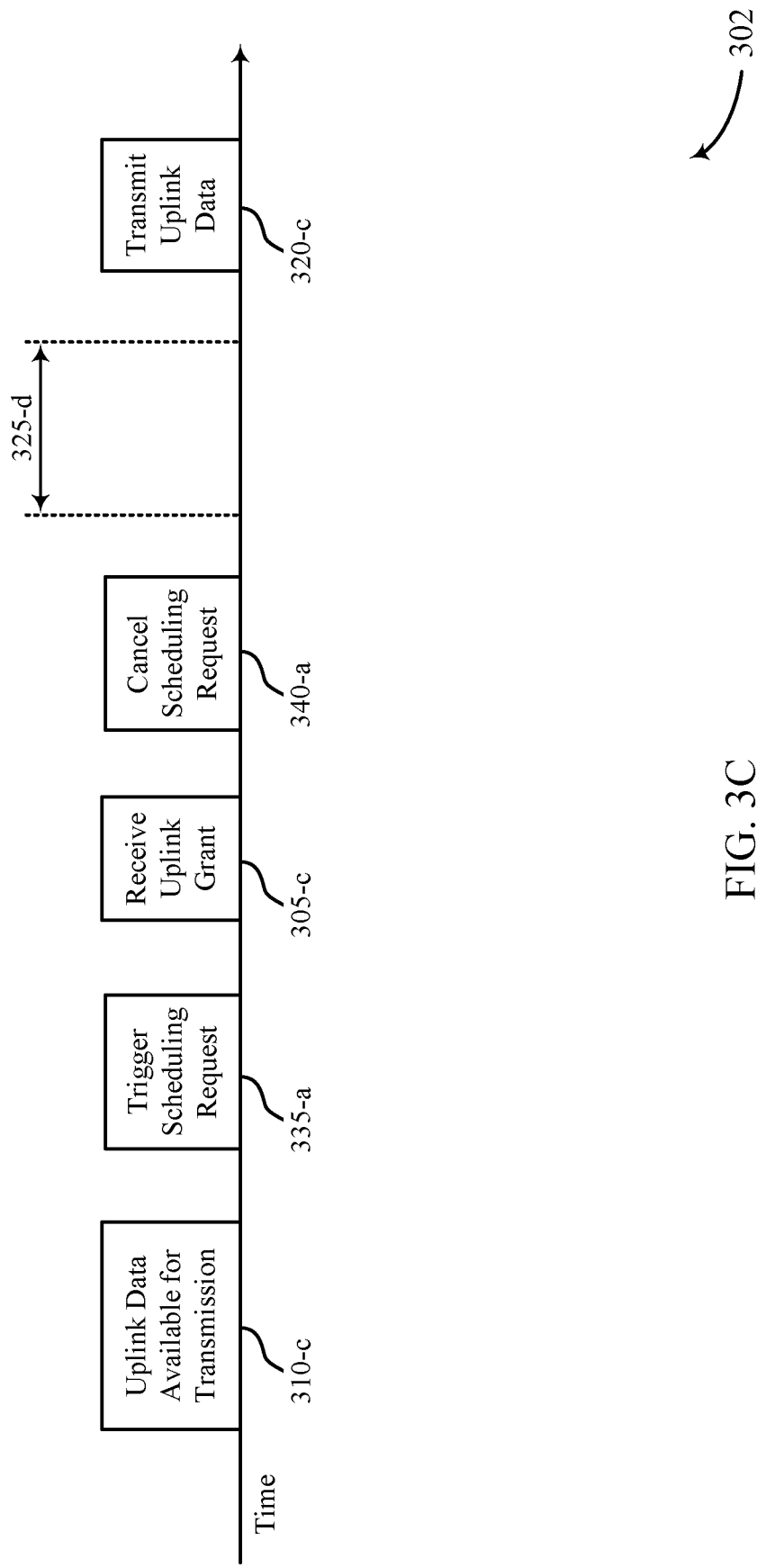

FIGS. 3A, 3B, and 3C illustrate examples of a communication timeline 300, a communication timeline 301, and a communication timeline 302 that support techniques for skipping scheduling requests in accordance with aspects of the present disclosure. The communication timeline 300, the communication timeline 301, and the communication timeline 302 may implement or be implemented by aspects of the wireless communications system 100 or the wireless communications system 200. For example, the communication timeline 300, the communication timeline 301, or the communication timeline 302 may implement or be implemented by a UE, which may be an example of a UE 115 described with reference to FIGS. 1 and 2.

In the communication timeline 300, the UE may refrain from transmitting a scheduling request to a base station during a scheduling request occasion based on receiving a pending uplink grant from the base station prior to the scheduling request occasion. In the communication timeline 301, the UE may refrain from retransmitting a scheduling request during a subsequent scheduling request occasion based on receiving an uplink grant prior to the subsequent scheduling request occasion. In the communication timeline 302, the UE may trigger a scheduling request and subsequently cancel the scheduling request after receiving an uplink grant.

As described herein, a UE may receive prescheduled downlink control information (DCI) prior to a scheduling request occasion. The prescheduled DCI may indicate an uplink grant that provides PUSCH resources to be used for subsequent transmissions from the UE. In some cases, however, PUSCH resources provided by the uplink grant may be after the scheduling request occasion. This may result in extraneous scheduling request transmissions from the UE, which may lead to increased power consumption and higher signaling overhead. Transmitting these extraneous scheduling requests may or may not affect an amount of time that the UE spends in an active state (e.g., awake time) depending on whether the network continues with prescheduling.

However, even when the network has not configured prescheduling for the UE, conventional scheduling request triggering techniques may result in unnecessary scheduling request transmissions. For example, if the UE receives an uplink DCI (e.g., in response to a scheduling request) before an upcoming scheduling request occasion but PUSCH resources indicated by the uplink DCI are subsequent to the upcoming scheduling request occasion, the UE may unnecessarily transmit a scheduling request during the upcoming scheduling request occasion.

In other examples, if the network (e.g., a base station) configures a parameter of the UE (e.g., K2, which refers to a number of slots between an upcoming DCI monitoring occasion and PUSCH resources) with a value that is greater than the maximum of a scheduling request prohibit timer and a scheduling request occasion periodicity (e.g., max(sr-ProhibitTimer, sr-Period)), the UE may retransmit a scheduling request each time a scheduling request is triggered, which may result in even greater power consumption and signaling overhead. In addition to the power penalty caused by these unnecessary scheduling request retransmissions, the UE may also spend more time in an active state (e.g., awake time).

For example, after retransmitting a scheduling request, even if the UE built (e.g., generated) PUSCH after receiving an uplink grant in response to the scheduling request (which may terminate the scheduling request procedure), the UE may restart another scheduling request procedure to maintain synchronization with the network's perception of UE connected-mode discontinuous reception (C-DRX) awake time. The UE may also restart various discontinuous reception (DRX) timers (e.g., C-DRX ON timers, inactivity timers, round trip time (RTT) timers, retransmission timers) when the network responds with an uplink grant responsive to retransmission of a scheduling request.

The aforementioned issues may occur when a UE transmits or retransmits a scheduling request during a scheduling request occasion although the UE has already received an uplink DCI prior to the scheduling request occasion. For example, if a base station transmits prescheduled grants to the UE twice during an active period of a C-DRX cycle of the UE (e.g., prior to the UE triggering a scheduling request) and every few slots (e.g., every 5 slots) after the UE triggers the scheduling request, the scheduling request triggered by the UE may not be canceled if an upcoming scheduling request occasion occurs prior to the UE initiating a PUSCH build (e.g., even though the UE has received an uplink DCI prior to triggering the scheduling request).

In other examples, if the UE skips a scheduling request due to receiving a prescheduled grant or a measurement occasion ping, the UE may prepare to send an RLC status for a response received from the network, which may result in the UE triggering a scheduling request. If, for example, the UE receives an uplink DCI in a first slot and the uplink DCI indicates PUSCH resources that are located in a second slot (e.g., subsequent to the first slot), the UE may still transmit a scheduling request in a scheduling request occasion that is located between the first slot and the second slot.

Similarly, if uplink data (e.g., a measurement occasion ping) arrives at the UE while the UE is in a C-DRX sleep mode, the uplink data may trigger a rude wakeup procedure at the UE. After waking from sleep mode, the UE may transmit a scheduling request to the network (e.g., because the UE has no available PUSCH resources). Upon receiving the scheduling request, the network may transmit an uplink grant to the UE in a first slot. If, for example, the uplink grant indicates PUSCH resources that are subsequent to an upcoming scheduling request occasion, the UE may retransmit the scheduling request during the upcoming scheduling request occasion even though the UE already received an uplink grant from the network.

In accordance with aspects of the present disclosure, a UE may trigger a scheduling request when a quantity of uplink data becomes available for transmission at the UE. At the time of the UE triggering the scheduling request due to a regular buffer status report (e.g., at the time of uplink data arrival), the UE may determine whether the UE has already received an uplink DCI for pending PUSCH transmissions (e.g., subsequent uplink transmissions). If the UE has already received an uplink DCI, the UE may refrain from transmitting a scheduling request to the network. Otherwise (e.g., if the UE does not have a pending uplink grant), the UE may proceed with transmission of the scheduling request.

If, for example, the UE triggers a scheduling request and the UE receives a prescheduled uplink DCI prior to an upcoming scheduling occasion but the PUSCH resources allocated by the prescheduled uplink DCI are after the upcoming scheduling request occasion, the UE may cancel (e.g., skip) transmission of the scheduling request during the upcoming scheduling request occasion. Similarly, if the UE transmits a scheduling request and subsequently receives an uplink grant (e.g., in response to the scheduling request or during a prescheduled DCI monitoring occasion) before a scheduling request retransmission occasion but the PUSCH resources allocated by the uplink grant are after the scheduling request retransmission occasion, the UE may skip retransmission of the scheduling request during the scheduling request retransmission occasion.

Let $t_0$ be the time at which the UE is ready to trigger a scheduling request (e.g., upon wakeup if uplink data becomes available while the UE is in a C-DRX sleep mode) and let $t_1$ be the time before the next physical uplink control channel (PUCCH) scheduling request occasion. In such examples, the UE may skip transmission of a scheduling request during the next PUCCH scheduling request occasion if the UE has detected prescheduling and $t_0+t_1+$ a minimum network response time (e.g., a delay between scheduling request transmission and DCI reception) is greater than a delay between to and the next prescheduled uplink grant monitoring occasion.

In the example of FIG. 3A, a UE may receive a pending uplink grant from a base station at 305-a. In some examples, the pending uplink grant may indicate PUSCH resources that are subsequent to a scheduling request occasion 325-*a*. At 310-*a*, a quantity of uplink data may become available for transmission at the UE. At 315-*a*, the UE may skip a scheduling request based on identifying that the UE has a pending uplink grant, even if the PUSCH resources provided by the pending uplink grant are subsequent to the scheduling request occasion 325-*a*. At 320-*a*, the UE may transmit at least a portion of the uplink data on the PUSCH resources indicated by the pending uplink grant.

In the example of FIG. 3B, a quantity of uplink data at a UE may become available for transmission at 310-*b*. Upon determining that the quantity of uplink data is available for transmission, the UE may transmit a scheduling request to a base station at 330-*a*. The UE may transmit the scheduling request during a scheduling request occasion 325-*b* (e.g., a first scheduling request occasion). In response to the scheduling request, the UE may receive an uplink grant from the base station at 305-*b*. The uplink grant may indicate PUSCH resources that are subsequent to a scheduling request occasion 325-*c* (e.g., a second scheduling request occasion). At 315-*b*, the UE may skip retransmission of the scheduling request based on receiving the uplink grant, even if the PUSCH resources indicated by the uplink grant are subsequent to the scheduling request occasion 325-*c*. At 320-*b*, the UE may transmit at least a portion of the uplink data to the base station on the PUSCH resources indicated by the uplink grant.

In the example of FIG. 3C, a UE may detect that a quantity of uplink data is available for transmission at 310-*c*. Accordingly, the UE may trigger a scheduling request at 335-*a*. After triggering the scheduling request, the UE may receive an uplink grant from a base station at 305-*c* (e.g., after triggering the scheduling request but before the next scheduling request occasion). At 340-*a*, the UE may cancel the scheduling request (e.g., upon reception of the uplink grant). As a result, the UE may refrain from transmitting the scheduling request during the scheduling request occasion 325-*d* (e.g., the next scheduling request occasion). At 320-*c*, the UE may transmit some or all of the uplink data on PUSCH resources indicated by the uplink grant.

The communication timeline 300, the communication timeline 301, and the communication timeline 302 may support techniques for reduced power consumption and lower signaling overhead at a UE, among other benefits. For example, the techniques and operations described in the communication timeline 300, the communication timeline 301, and the communication timeline 302 may enable a UE to cancel or skip one or more scheduling requests if various conditions are met (e.g., if the UE has a pending uplink grant or if a scheduling request retransmission timer of the UE is active). Configuring a UE to selectively cancel scheduling requests in accordance with aspects of the present disclosure may result in lower signaling overhead (e.g., fewer extraneous transmissions) and greater power savings at the UE.

Figure 4:
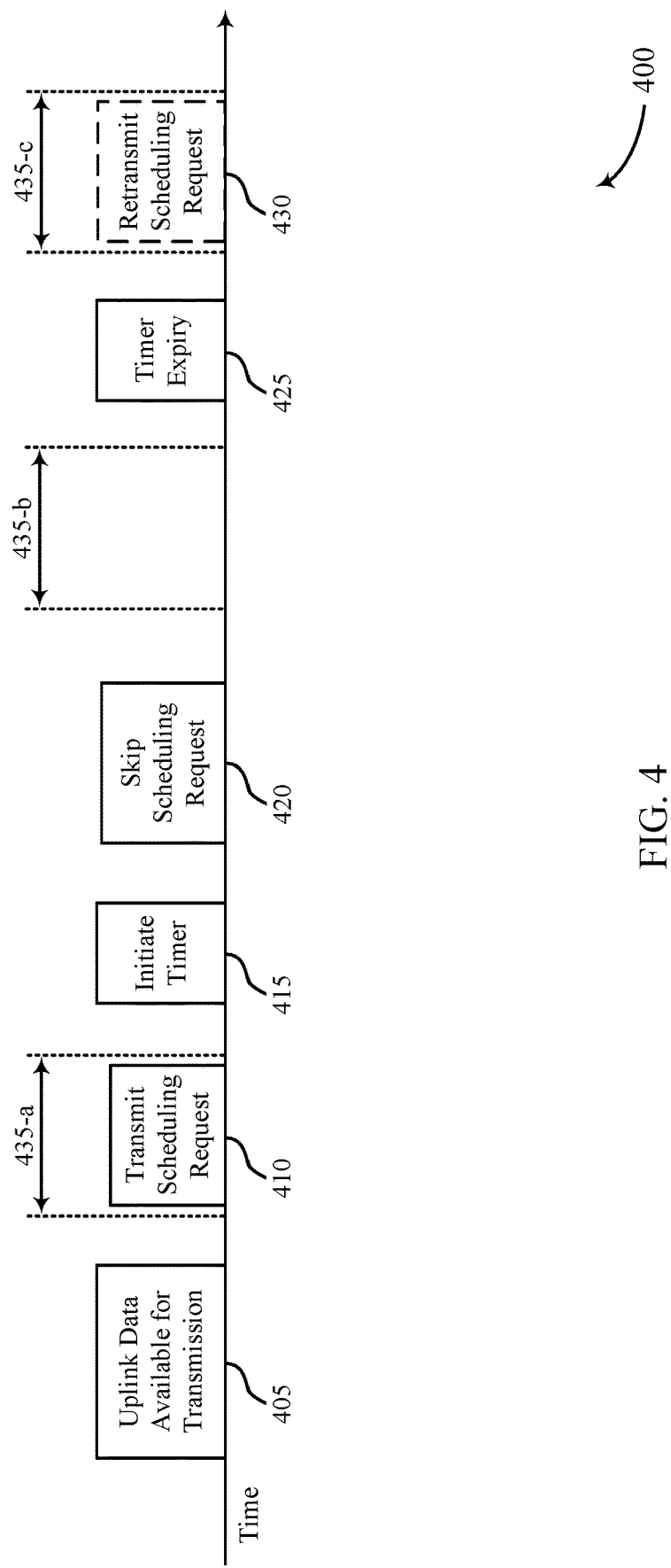
FIG. 4 illustrates an example of a communication timeline that supports techniques for skipping scheduling requests in accordance with aspects of the present disclosure.

FIG. 4 illustrates an example of a communication timeline 400 that supports techniques for skipping scheduling requests in accordance with aspects of the present disclosure. The communication timeline 400 may implement or be implemented by aspects of the wireless communications system 100 or the wireless communications system 200. For example, the communication timeline 400 may implement or be implemented by a UE, which may be an example of a UE 115 described with reference to FIGS. 1 and 2. In the communication timeline 400, the UE may initiate a scheduling request retransmission timer after transmitting a scheduling request to a base station during a scheduling request occasion, and may refrain from retransmitting the scheduling request until the scheduling request retransmission timer has expired.

In some cases, a network (e.g., a network entity such as a base station) may configure a UE with a scheduling request prohibit timer (e.g., sr-ProhibitTimer) and a scheduling request occasion periodicity (e.g., a periodicity of 4 slots) via RRC signaling. The network may indicate a value for the scheduling request prohibit timer within a scheduling request configuration information element (e.g., SchedulingRequestConfig). In other cases, the network may signal a value for the scheduling request occasion periodicity and may omit (e.g., refrain from signaling) a value for the scheduling request prohibit timer. In such cases, the UE may set the scheduling request prohibit timer to zero by default. However, even if the network successfully receives a scheduling request from the UE, the network may be unable to respond to the UE (e.g., with an uplink grant) before the next scheduling request occasion (e.g., as indicated by the scheduling request occasion periodicity). That is, the network may have a minimum response time before which the network is unable to respond to scheduling requests from the UE.

In some examples, this minimum response time (e.g., a delay between scheduling request transmission and DCI reception) may have a duration of multiple slots. As a result, the UE may unnecessarily retransmit scheduling requests to the network before the minimum response time has elapsed, leading to a large number of extraneous scheduling request retransmissions from the UE. Even with a relatively low block error rate (BLER) and successful scheduling request reception at the network side, conventional scheduling request triggering techniques (e.g., when network turnaround is greater than a scheduling request occasion periodicity) may result in a relatively large number of extraneous scheduling request retransmissions from the UE. As a result, the UE may experience lower power efficiency and decreased battery life.

Moreover, if the UE is configured with an exposure budget (e.g., a specific absorption rate (SAR) budget or a maximum permissible exposure (MPE) budget) by the base station to limit radio frequency (RF) energy produced by the UE, scheduling request retransmissions may consume a relatively large portion of this exposure budget. As a result, frequent scheduling request retransmissions can use up the exposure budget of the UE and reduce the power that is available for future PUSCH and PUCCH transmissions from the UE.

As described herein, the network may or may not configure a UE with a scheduling request prohibit timer (e.g., sr-ProhibitTimer) via a scheduling request configuration information element (e.g., SchedulingRequestConfig). In accordance with the techniques described herein, if the network does not configure the UE with a value for the scheduling request prohibit timer, the UE may internally set the scheduling request prohibit timer to a value that is larger than a scheduling request occasion periodicity of the network. Additionally or alternatively, the UE may determine a minimum scheduling request grant delay (or an internal lower bound) for the network, and may refrain from retransmitting scheduling requests within this time period (e.g., the time period indicated by the value set for the scheduling request prohibit timer). As described herein, the minimum scheduling request grant delay may refer to a delay that the UE has observed between scheduling request transmission (e.g., a first time at which the UE transmit a scheduling request to a network entity) and DCI reception (e.g., a second time at which the UE receives DCI in response to the scheduling request).

In the example of FIG. 4, a UE may determine that a quantity of uplink data is available for transmission at 405. Accordingly, the UE may transmit a scheduling request to a base station at 410. The UE may transmit the scheduling request during a scheduling request occasion 435-a (e.g., a first scheduling request occasion). At 415, the UE may initiate a scheduling request retransmission timer based on transmitting the scheduling request. At 420, the UE may skip retransmission of the scheduling request if the scheduling request retransmission timer is still active (e.g., if the scheduling request retransmission timer has not expired). As such, the UE may not retransmit the scheduling request during a scheduling request occasion 435-b (e.g., a second scheduling request occasion).

The UE may also refrain from retransmitting the scheduling request based on an available exposure budget for PUCCH and PUSCH transmissions from the UE. For example, if the UE has a limited SAR or MPE budget, the UE may refrain from retransmitting the scheduling request, even if a scheduling request occasion configuration of the UE would permit the UE to retransmit the scheduling request sooner. If the UE is not constrained by an exposure budget or has sufficient exposure budget, the UE may retransmit the scheduling request during a scheduling request occasion (or more frequently). For example, if the UE has a sufficiently large exposure budget, the UE may retransmit the scheduling request during the scheduling request occasion 435-b.

At 425, the UE may determine that the scheduling request retransmission timer has expired. At 430, the UE may retransmit the scheduling request during a scheduling request occasion 435-c based on determining that the scheduling request retransmission timer has expired. In an example, the UE may skip retransmitting the scheduling request while the scheduling request retransmission timer is unexpired, such as when the timer expires at any time after a beginning in time of a scheduling request occasion (e.g., during the scheduling request occasion).

The communication timeline 400 may support techniques for reduced power consumption and lower signaling overhead at a UE, among other benefits. For example, the techniques and operations described in the communication timeline 400 may enable a UE to cancel or skip one or more scheduling requests if various conditions are met (e.g., if the UE has a pending uplink grant or if a scheduling request retransmission timer of the UE is active). Configuring a UE to selectively cancel scheduling requests in accordance with aspects of the present disclosure may result in lower signaling overhead (e.g., fewer extraneous transmissions) and greater power savings at the UE.

Figure 5:
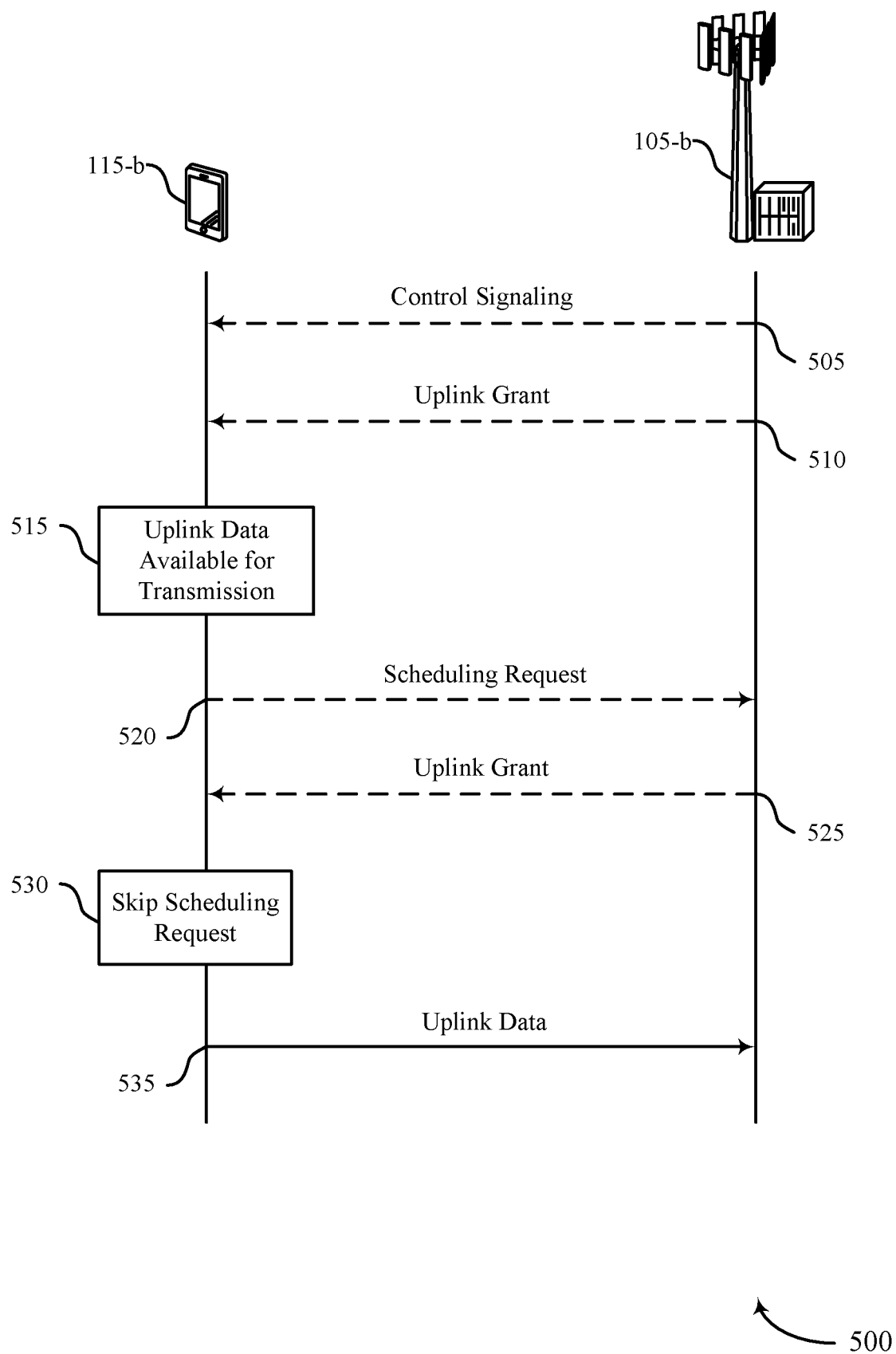
FIGS. 5 and 6 illustrate examples of process flows that support techniques for skipping scheduling requests in accordance with aspects of the present disclosure.

FIG. 5 illustrates an example of a process flow 500 that supports techniques for skipping scheduling requests in accordance with aspects of the present disclosure. The process flow 500 may implement or be implemented by aspects of the wireless communications system 100 or the wireless communications system 200. For example, the process flow 500 may include a UE 115-b and a base station 105-b, which may be examples of corresponding devices described with reference to FIGS. 1 and 2. In the following description of the process flow 500, operations between the UE 115-b and the base station 105-b may be performed in a different order or at a different time than as shown. Additionally or alternatively, some operations may be omitted from the process flow 500, and other operations may be added to the process flow 500.

At 505, the base station 105-b may transmit control signaling to the UE 115-b. The control signaling may indicate one or both of a scheduling request prohibit timer value (e.g., sr-ProhibitTimer) or a scheduling request occasion periodicity (e.g., sr-Period). Alternatively, the control signaling may omit values for the scheduling request prohibit timer and the scheduling request occasion periodicity. The control signaling may include RRC signaling, a MAC-CE, or DCI, among other examples. At 515, a quantity of uplink data may become available for transmission at the UE 115-b prior to a first scheduling request occasion. The UE 115-b may trigger a scheduling request upon determining that the uplink data is available for transmission.

In some examples, the UE 115-b may receive an uplink grant from the base station 105-b at 510 (e.g., prior to the first scheduling request occasion). More specifically, the UE 115-b may receive prescheduled DCI from the base station 105-b that indicates the uplink grant. The UE 115-b may receive the prescheduled DCI during a prescheduled uplink grant monitoring occasion. In other examples (e.g., if the UE 115-b does not have a pending uplink grant), the UE 115-a may transmit a scheduling request to the base station 105-b at 520 based on identifying that uplink data is available for transmission at the UE 115-b. The UE 115-b may transmit the scheduling request to the base station 105-b on one or more PUCCH resources during the first scheduling request occasion. Accordingly, the base station 105-b may transmit the uplink grant to the UE 115-b at 525 (e.g., in response to the scheduling request). The uplink grant may indicate one or more PUSCH resources allocated for subsequent uplink transmissions from the UE 115-b.

At 530, the UE 115-b may skip transmission or retransmission of the scheduling request based on receiving the uplink grant, even if a resource allocation provided by the uplink grant is subsequent to a second scheduling request occasion (e.g., the next scheduling request occasion). The UE 115-b may refrain from transmitting or retransmitting the scheduling request based on a determination that prescheduling is activated for the UE 115-b, a first time associated with the UE 115-b triggering the scheduling request, a second time associated with the second scheduling request occasion, a third time associated with a prescheduled uplink grant monitoring occasion (e.g., a prescheduled DCI monitoring occasion), a delay between scheduling request transmission and uplink grant reception, or a combination thereof. More specifically, the UE 115-b may skip transmission or retransmission of the scheduling request during the second scheduling request based on determining that a summation of the delay between scheduling request transmission and uplink grant reception and a difference between the first time (e.g., the time at which the UE 115-b triggered the scheduling request) and the second time (e.g., the time associated with the second scheduling request occasion) is greater than a difference between the first time and the third time (e.g., the time associated with the prescheduled uplink grant monitoring occasion).

At 535, the UE 115-b may transmit some or all of the uplink data to the base station 105-b using a resource allocation indicated by the uplink grant. Additionally or alternatively, the UE 115-b may transmit a buffer status report to the base station 105-b using the resource allocation indicated by the uplink grant. The buffer status report may indicate a quantity of uplink data that is available for transmission at the UE 115-b. In some examples, the UE 115-b may receive a second uplink grant from the base station 105-*b* in response to the buffer status report. The UE 115-*b* may transmit a remainder of the available uplink data on PUSCH resources provided by the second uplink grant.

The process flow 500 may support techniques for reduced power consumption and lower signaling overhead at the UE 115-*b*, among other benefits. For example, the techniques and operations described in the process flow 500 may enable the UE 115-*b* to cancel or skip one or more scheduling requests if various conditions are met (e.g., if the UE 115-*b* has a pending uplink grant or if a scheduling request retransmission timer of the UE 115-*b* is active). Configuring the UE 115-*b* to selectively cancel scheduling requests in accordance with aspects of the present disclosure may result in lower signaling overhead (e.g., fewer extraneous transmissions) and greater power savings at the UE 115-*b*.

Figure 6:
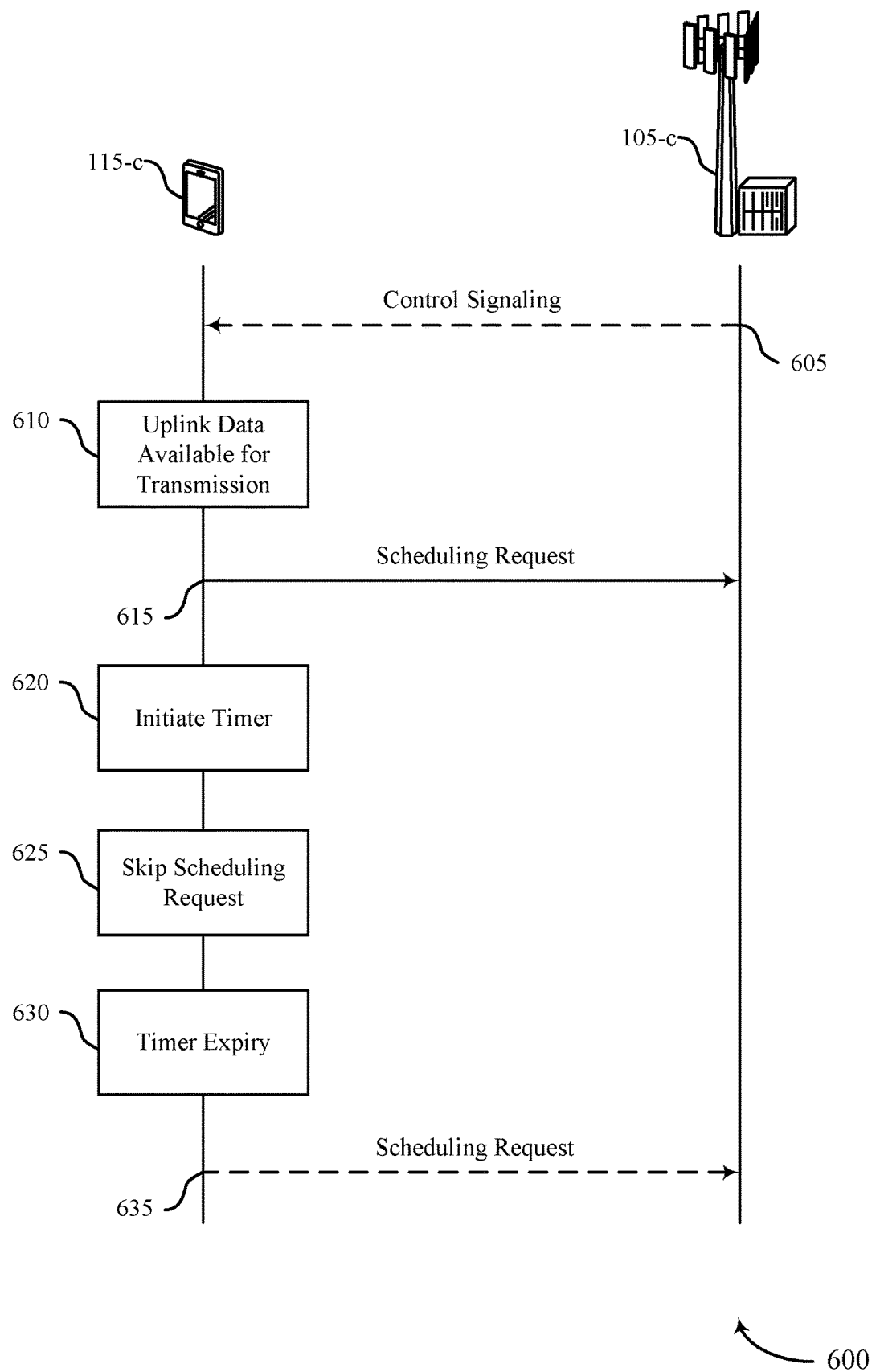

FIG. 6 illustrates an example of a process flow 600 that supports techniques for skipping scheduling requests in accordance with aspects of the present disclosure. The process flow 600 may implement or be implemented by aspects of the wireless communications system 100 or the wireless communications system 200. For example, the process flow 600 may include a UE 115-*c* and a base station 105-*c*, which may be examples of corresponding devices described with reference to FIGS. 1 and 2. In the following description of the process flow 600, operations between the UE 115-*c* and the base station 105-*c* may be performed in a different order or at a different time than as shown. Additionally or alternatively, some operations may be omitted from the process flow 600, and other operations may be added to the process flow 600.

At 605, the base station 105-*c* may transmit control signaling to the UE 115-*c*. The control signaling may indicate one or both of a scheduling request prohibit timer value (e.g., sr-ProhibitTimer) or a scheduling request occasion periodicity (e.g., sr-Period). Alternatively, the control signaling may omit values for the scheduling request prohibit timer and the scheduling request occasion periodicity. The control signaling may include RRC signaling, a MAC-CE, or DCI, among other examples. At 610, a quantity of uplink data may become available for transmission at the UE 115-*c*. The UE 115-*c* may trigger a scheduling request based on determining that the uplink data is available for transmission. At 615, the UE 115-*c* may transmit the scheduling request to the base station 105-*c* based on triggering the scheduling request (e.g., in response to the uplink data becoming available for transmission). The UE 115-*c* may transmit the scheduling request on one or more PUCCH resources during a first scheduling request occasion.

At 620, the UE 115-*c* may initiate a scheduling request retransmission timer after transmitting the scheduling request to the base station 105-*c* during the first scheduling request occasion. A duration of the scheduling request retransmission timer may be greater than the scheduling request occasion periodicity, the scheduling request prohibit timer, a minimum network response time observed by the UE 115-*c*, or a combination thereof. In some examples, the UE 115-*c* may determine the minimum network response time based on measuring a delay between a first time at which the UE 115-*c* transmits a scheduling request to the base station 105-*c* and a second time at which the UE 115-*c* receives an uplink grant from the base station 105-*c* (e.g., responsive to the scheduling request).

As an example, if the UE 115-*c* transmits a scheduling request to the base station 105-*c* during a first slot (e.g., slot 1), there may be some latency between when the UE 115-*c* transmits the scheduling request and when the UE 115-*c* receives an uplink grant responsive to the scheduling request. Thus, if the UE 115-*c* receives the uplink grant (e.g., an instance of DCI indicating PUSCH resources allocated for uplink transmissions from the UE 115-*c*) from the base station 105-*c* during a seventh slot (e.g., slot 7), the UE 115-*c* may determine that the minimum network response time for the base station 105-*c* is approximately six slots. The UE 115-*c* may use this minimum network response time to determine a suitable duration for the scheduling request retransmission timer.

The scheduling request retransmission timer may be set at a minimum grant response time, an average response time, other statistical metric of a grant response time, or the like. Also, the UE 115-*c* may determine the duration of the scheduling request retransmission timer on a per-cell basis, on a per-base station basis, or the like. Additionally or alternatively, the UE 115-*c* may determine the duration of the scheduling request retransmission timer based on grant response timeliness that is more recent than older measurements of grant response timeliness. For example, the UE 115-*c* may determine the minimum network response time as the shortest time in which the base station 105-*c* responds to a scheduling request with a grant within the past ten seconds (or other desired time interval), and may disregard older observations (e.g., prior to the last ten seconds) of the minimum network response time when identifying the shortest time.

At 625, the UE 115-*c* may skip retransmission of the scheduling request based on determining that the scheduling request retransmission timer is still active (e.g., not expired). For example, if a duration of the scheduling request prohibit timer is set as 5 ms, the UE 115-*c* may skip retransmission of the scheduling request during scheduling request occasions that are within 5 ms of the initial scheduling request transmission. In some examples, the UE 115-*c* may skip retransmission of the scheduling request based on the scheduling request retransmission timer expiring after the beginning of a second scheduling request occasion (e.g., the next scheduling request occasion).

At 630, the UE 115-*c* may determine that the scheduling request retransmission timer has expired. In some examples, the UE 115-*c* may retransmit the scheduling request at 635 (e.g., based on determining that the scheduling request retransmission timer has expired) in a next scheduling request occasion if the UE 115-*c* has not yet received a grant. In other examples, the UE 115-*c* may locally reconfigure (e.g., optimize) the scheduling request retransmission timer based on other parameters (e.g., sr-ProhibitTimer, sr-Period), and may refrain from retransmitting the scheduling request in accordance with the reconfigured scheduling request retransmission timer.

Alternatively, or additionally, the UE 115-*c* may refrain from retransmitting the scheduling request after the scheduling request retransmission timer has expired if, for example, the UE 115-*c* receives an uplink grant prior to retransmitting the scheduling request. In such examples, the UE 115-*c* may transmit some or all of the uplink data on a resource allocation (e.g., PUSCH resources) provided by the uplink grant. The UE 115-*c* may also transmit a buffer status report to the base station 105-*c* using the resource allocation provided by the uplink grant. The buffer status report may indicate the quantity of uplink data that is available for transmission at the UE 115-*c*.

The process flow 600 may support techniques for reduced power consumption and lower signaling overhead at the UE 115-*c*, among other benefits. For example, the techniques and operations described in the process flow 600 may enable the UE 115-*c* to cancel or skip one or more scheduling requests if various conditions are met (e.g., if the UE 115-*c* has a pending uplink grant or if a scheduling request retransmission timer of the UE 115-*c* is active). Configuring the UE 115-*c* to selectively cancel scheduling requests in accordance with aspects of the present disclosure may result in lower signaling overhead (e.g., fewer extraneous transmissions) and greater power savings at the UE 115-*c*.

Figure 7:
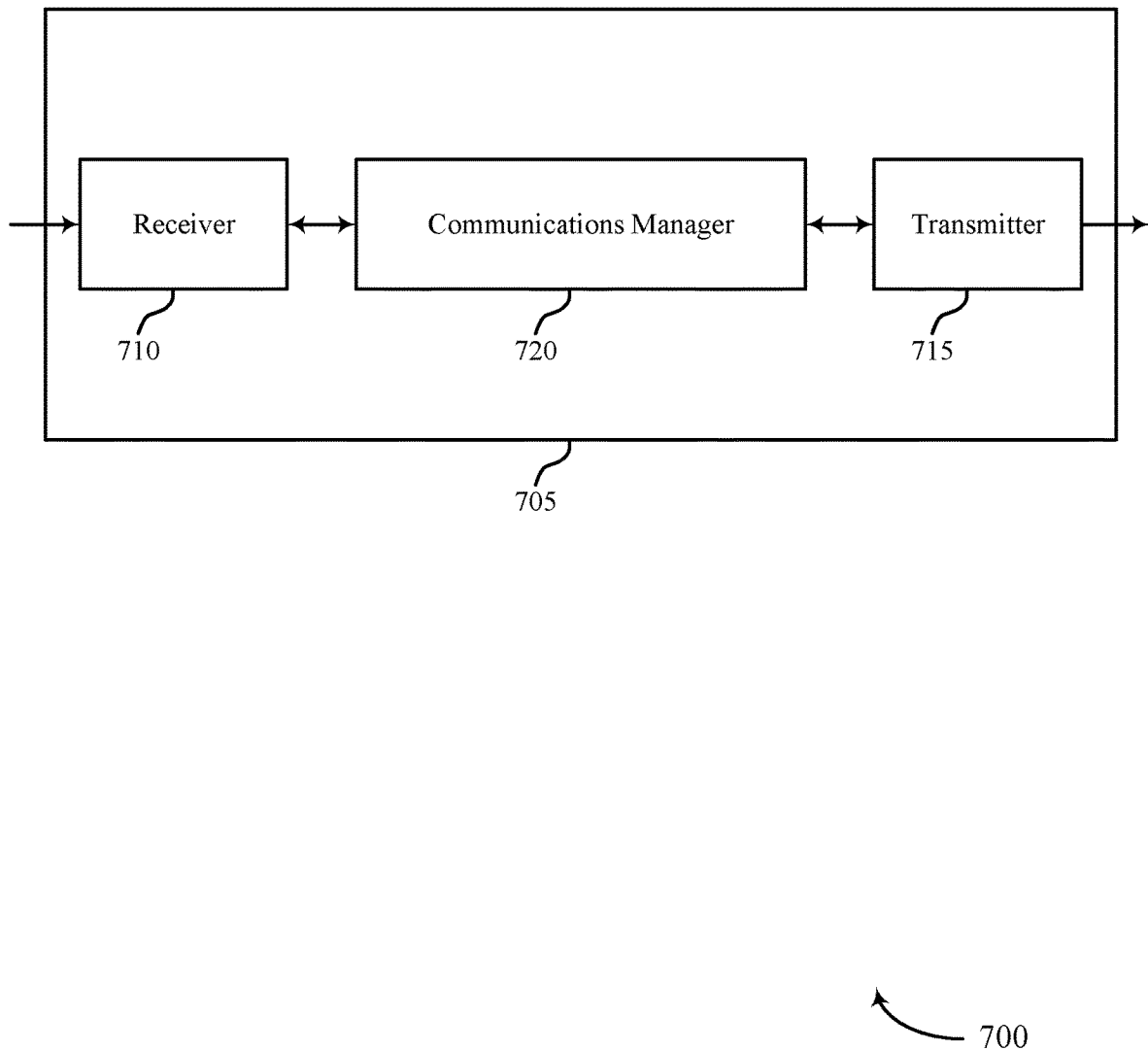
FIGS. 7 and 8 show diagrams of devices that support techniques for skipping scheduling requests in accordance with aspects of the present disclosure.

FIG. 7 shows a diagram 700 of a device 705 that supports techniques for skipping scheduling requests in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for skipping scheduling requests). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for skipping scheduling requests). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for skipping scheduling requests as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with one or both of the receiver 710 or the transmitter 715. For example, the communications manager 720 may receive information from the receiver 710, send information to the transmitter 715, or be integrated in combination with one or both of the receiver 710 or the transmitter 715 to receive information, transmit information, or perform various other operations as described herein.

The communications manager 720 may support wireless communications at the device 705 (e.g., a UE 115) in accordance with examples as disclosed herein. For example, the communications manager 720 may be configured as or otherwise support a means for identifying that uplink data is available for transmission at the device 705 prior to a scheduling request occasion. The communications manager 720 may be configured as or otherwise support a means for skipping, during the scheduling request occasion, transmission of a scheduling request for requesting resources to use for transmission of the uplink data based on identifying that an uplink grant is pending. The communications manager 720 may be configured as or otherwise support a means for transmitting, to a base station, at least a portion of the uplink data using a resource allocation indicated by the uplink grant.

Additionally or alternatively, the communications manager 720 may support wireless communications at the device 705 in accordance with examples as disclosed herein. For example, the communications manager 720 may be configured as or otherwise support a means for transmitting, to a base station during a first scheduling request occasion, a scheduling request for requesting a grant that provides a resource allocation for uplink transmission. The communications manager 720 may be configured as or otherwise support a means for initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. The communications manager 720 may be configured as or otherwise support a means for skipping retransmission of the scheduling request during a second scheduling request occasion that is subsequent to the first scheduling request occasion based on the scheduling request retransmission timer.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption and more efficient utilization of communication resources. For example, the described techniques may reduce a number of scheduling request transmissions (or retransmissions) performed by the device 705, which may enable the device 705 to attain greater power savings. Reducing the number of scheduling request transmissions performed by the device 705 may also result in lower signaling overhead at the device 705 (e.g., by reducing the frequency of extraneous transmissions from the device 705).

Figure 8:
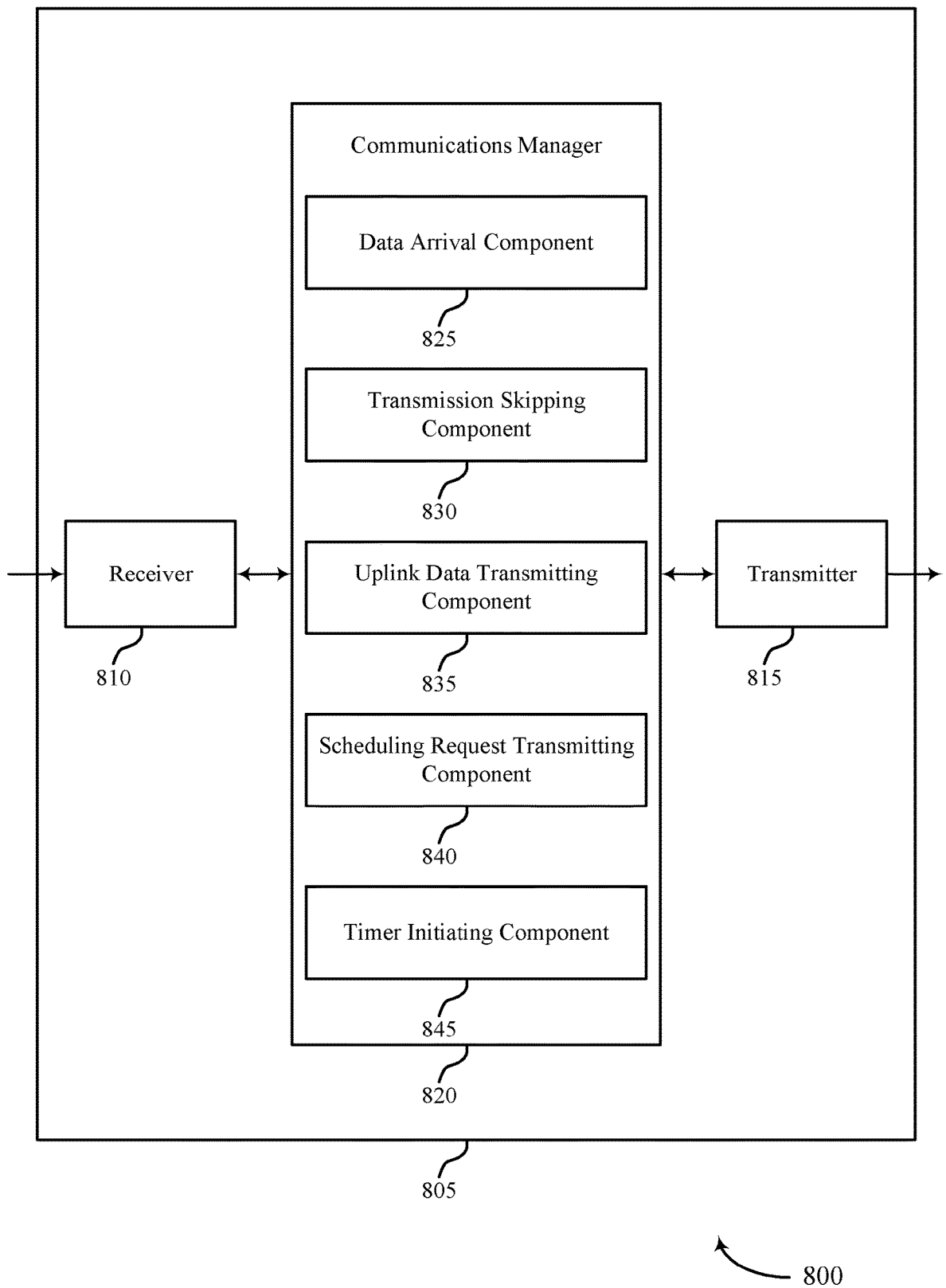

FIG. 8 shows a diagram 800 of a device 805 that supports techniques for skipping scheduling requests in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for skipping scheduling requests). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for skipping scheduling requests). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for skipping scheduling requests as described herein. For example, the communications manager 820 may include a data arrival component 825, a transmission skipping component 830, an uplink data transmitting component 835, a scheduling request transmitting component 840, a timer initiating component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with one or both of the receiver 810 or the transmitter 815. For example, the communications manager 820 may receive information from the receiver 810, send information to the transmitter 815, or be integrated in combination with one or both of the receiver 810 or the transmitter 815 to receive information, transmit information, or perform various other operations as described herein.

The communications manager 820 may support wireless communications at the device 805 (e.g., a UE 115) in accordance with examples as disclosed herein. The data arrival component 825 may be configured as or otherwise support a means for identifying that uplink data is available for transmission at the device 805 prior to a scheduling request occasion. The transmission skipping component 830 may be configured as or otherwise support a means for skipping, during the scheduling request occasion, transmission of a scheduling request for requesting resources to use for transmission of the uplink data based on identifying that an uplink grant is pending. The uplink data transmitting component 835 may be configured as or otherwise support a means for transmitting, to a base station, at least a portion of the uplink data using a resource allocation indicated by the uplink grant.

Additionally or alternatively, the communications manager 820 may support wireless communications at the device 805 in accordance with examples as disclosed herein. The scheduling request transmitting component 840 may be configured as or otherwise support a means for transmitting, to a base station during a first scheduling request occasion, a scheduling request for requesting a grant that provides a resource allocation for uplink transmission. The timer initiating component 845 may be configured as or otherwise support a means for initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. The transmission skipping component 830 may be configured as or otherwise support a means for skipping retransmission of the scheduling request during a second scheduling request occasion that is subsequent to the first scheduling request occasion based on the scheduling request retransmission timer.

Figure 9:
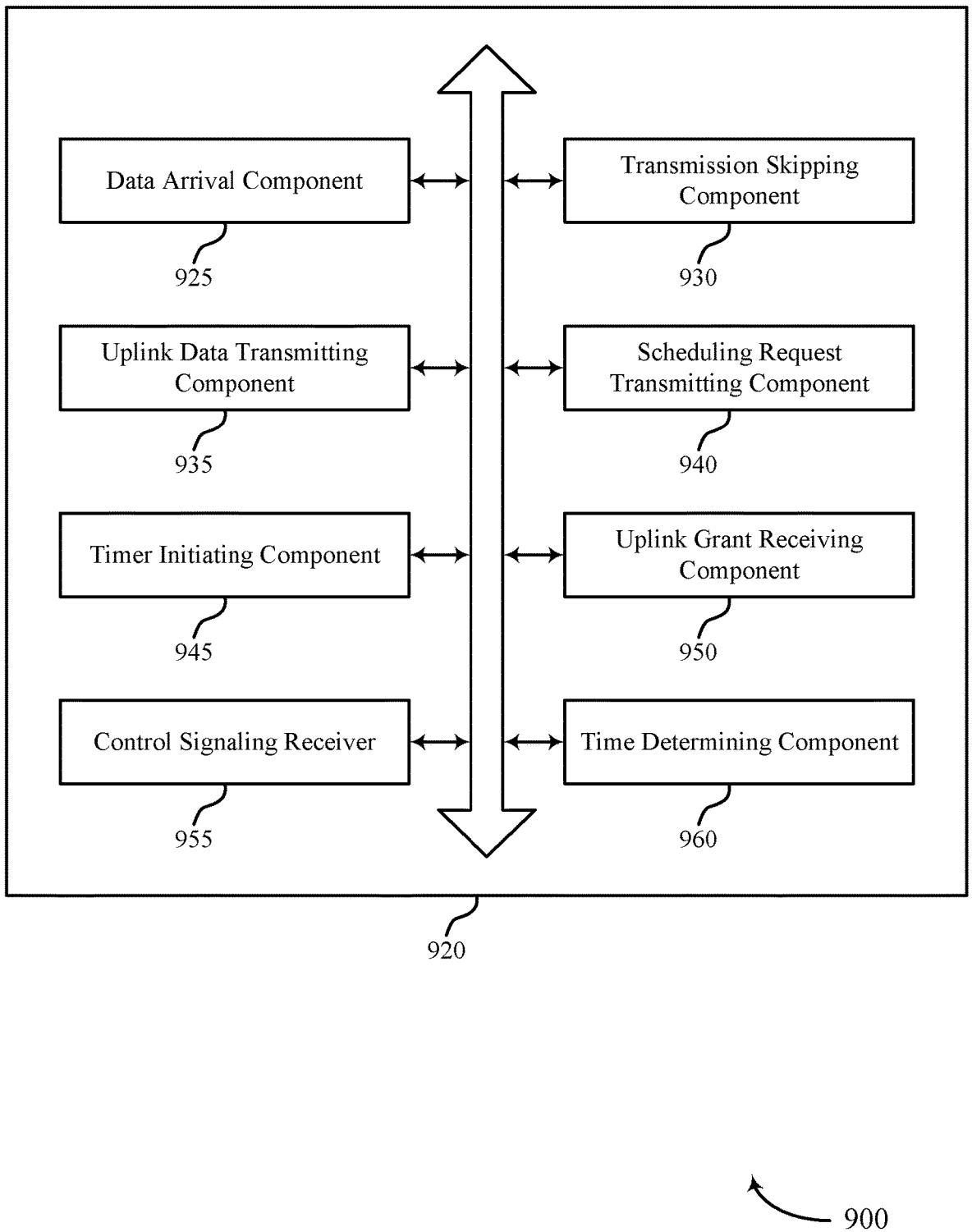
FIG. 9 shows a diagram of a communications manager that supports techniques for skipping scheduling requests in accordance with aspects of the present disclosure.

FIG. 9 shows a diagram 900 of a communications manager 920 that supports techniques for skipping scheduling requests in accordance with aspects of the present disclosure. The communications manager 920 may be an example of aspects of one or both of a communications manager 720 or a communications manager 820 as described herein. The communications manager 920, or various components thereof, may be an example of means for performing various aspects of techniques for skipping scheduling requests as described herein. For example, the communications manager 920 may include a data arrival component 925, a transmission skipping component 930, an uplink data transmitting component 935, a scheduling request transmitting component 940, a timer initiating component 945, an uplink grant receiving component 950, a control signaling receiver 955, a time determining component 960, or any combination thereof. Each of these components may communicate, directly or indirectly, with one another (e.g., via one or more buses).

The communications manager 920 may support wireless communications at a UE in accordance with examples as disclosed herein. The data arrival component 925 may be configured as or otherwise support a means for identifying that uplink data is available for transmission at the UE prior to a scheduling request occasion. The transmission skipping component 930 may be configured as or otherwise support a means for skipping, during the scheduling request occasion, transmission of a scheduling request for requesting resources to use for transmission of the uplink data based on identifying that an uplink grant is pending. The uplink data transmitting component 935 may be configured as or otherwise support a means for transmitting, to a base station, at least a portion of the uplink data using a resource allocation indicated by the uplink grant.

In some examples, to support transmitting at least the portion of the uplink data, the uplink data transmitting component 935 may be configured as or otherwise support a means for transmitting at least the portion of the uplink data to the base station using the resource allocation indicated by the uplink grant that occurs subsequent to the scheduling request occasion.

In some examples, the scheduling request transmitting component 940 may be configured as or otherwise support a means for triggering the scheduling request based on identifying that the uplink data is available for transmission. In some examples, the uplink grant receiving component 950 may be configured as or otherwise support a means for receiving the uplink grant from the base station after triggering the scheduling request and before the scheduling request occasion. In some examples, the transmission skipping component 930 may be configured as or otherwise support a means for canceling the scheduling request based on receiving the uplink grant.

In some examples, the scheduling request transmitting component 940 may be configured as or otherwise support a means for transmitting an initial scheduling request to the base station during a scheduling request occasion that occurs prior to the scheduling request occasion based on identifying that the uplink data is available for transmission at the UE. In some examples, the uplink grant receiving component 950 may be configured as or otherwise support a means for receiving the uplink grant from the base station in response to transmitting the initial scheduling request, where skipping transmission of the scheduling request is based on receiving the uplink grant from the base station.

In some examples, the uplink grant receiving component 950 may be configured as or otherwise support a means for receiving, from the base station and prior to the scheduling request occasion, prescheduled DCI indicating the uplink grant that provides a PUSCH resource allocation for transmission of the uplink data, where the PUSCH resource allocation is subsequent to the scheduling request occasion.

In some examples, the uplink grant receiving component 950 may be configured as or otherwise support a means for receiving, from the base station, DCI indicating the uplink grant, where skipping transmission of the scheduling request is based on receiving the DCI from the base station.

In some examples, the uplink grant receiving component 950 may be configured as or otherwise support a means for receiving, from the base station, the uplink grant indicating a set of PUSCH resources allocated for transmission of the uplink data.

In some examples, to support transmitting at least the portion of the uplink data, the uplink data transmitting component 935 may be configured as or otherwise support a means for transmitting a buffer status report to the base station using the resource allocation indicated by the uplink grant, the buffer status report indicating a quantity of the uplink data available for transmission at the UE.

In some examples, the uplink grant receiving component 950 may be configured as or otherwise support a means for receiving a second uplink grant from the base station. In some examples, the uplink data transmitting component 935 may be configured as or otherwise support a means for transmitting a remainder of the uplink data to the base station on a second resource allocation indicated by the second uplink grant.

In some examples, to support skipping transmission of the scheduling request, the transmission skipping component 930 may be configured as or otherwise support a means for skipping transmission of the scheduling request during the scheduling request occasion based on a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof.

In some examples, the time determining component 960 may be configured as or otherwise support a means for determining that a summation of the delay between scheduling request transmission and uplink grant reception and a difference between the first time and the second time is greater than a difference between the third time and the first time, where skipping transmission of the scheduling request is based on the determining.

In some examples, the uplink grant receiving component 950 may be configured as or otherwise support a means for receiving, during the prescheduled uplink grant monitoring occasion, DCI indicating the uplink grant. In some examples, the uplink data transmitting component 935 may be configured as or otherwise support a means for transmitting at least a portion of the uplink data using the resource allocation indicated by the uplink grant.

Additionally or alternatively, the communications manager 920 may support wireless communications at a UE in accordance with examples as disclosed herein. The scheduling request transmitting component 940 may be configured as or otherwise support a means for transmitting, to a base station during a first scheduling request occasion, a scheduling request for requesting a grant that provides a resource allocation for uplink transmission. The timer initiating component 945 may be configured as or otherwise support a means for initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. In some examples, the transmission skipping component 930 may be configured as or otherwise support a means for skipping retransmission of the scheduling request during a second scheduling request occasion that is subsequent to the first scheduling request occasion based on the scheduling request retransmission timer.

In some examples, the control signaling receiver 955 may be configured as or otherwise support a means for receiving control signaling indicating the scheduling request occasion configuration, where the duration of the scheduling request retransmission timer is set based on the scheduling request occasion configuration omitting a value for the scheduling request prohibit timer that allows the base station to respond to the scheduling request.

In some examples, the time determining component 960 may be configured as or otherwise support a means for determining the duration of the scheduling request retransmission timer based on one or both of a scheduling request occasion periodicity of the base station or the observed network response delay that is a minimum network response delay observed by the UE of the base station responding to one or more prior scheduling requests, where skipping retransmission of the scheduling request is based on determining the duration of the scheduling request retransmission timer.

In some examples, the uplink grant receiving component 950 may be configured as or otherwise support a means for receiving the grant based on transmitting the scheduling request during the first scheduling request occasion. In some examples, the uplink data transmitting component 935 may be configured as or otherwise support a means for transmitting one or both of a buffer status report or uplink data using the resource allocation provided by the grant.

In some examples, to support receiving the grant, the uplink grant receiving component 950 may be configured as or otherwise support a means for receiving, from the base station, DCI indicating the grant, where transmitting one or both of the buffer status report or the uplink data is based on receiving the DCI from the base station.

In some examples, to support transmitting the scheduling request during the first scheduling request occasion, the scheduling request transmitting component 940 may be configured as or otherwise support a means for transmitting the scheduling request on one or more PUCCH resources during the first scheduling request occasion.

In some examples, to support skipping retransmission of the scheduling request, the transmission skipping component 930 may be configured as or otherwise support a means for skipping retransmission of the scheduling request during the second scheduling request occasion based on an available exposure budget for PUCCH transmissions and PUSCH transmissions from the UE.

Figure 10:
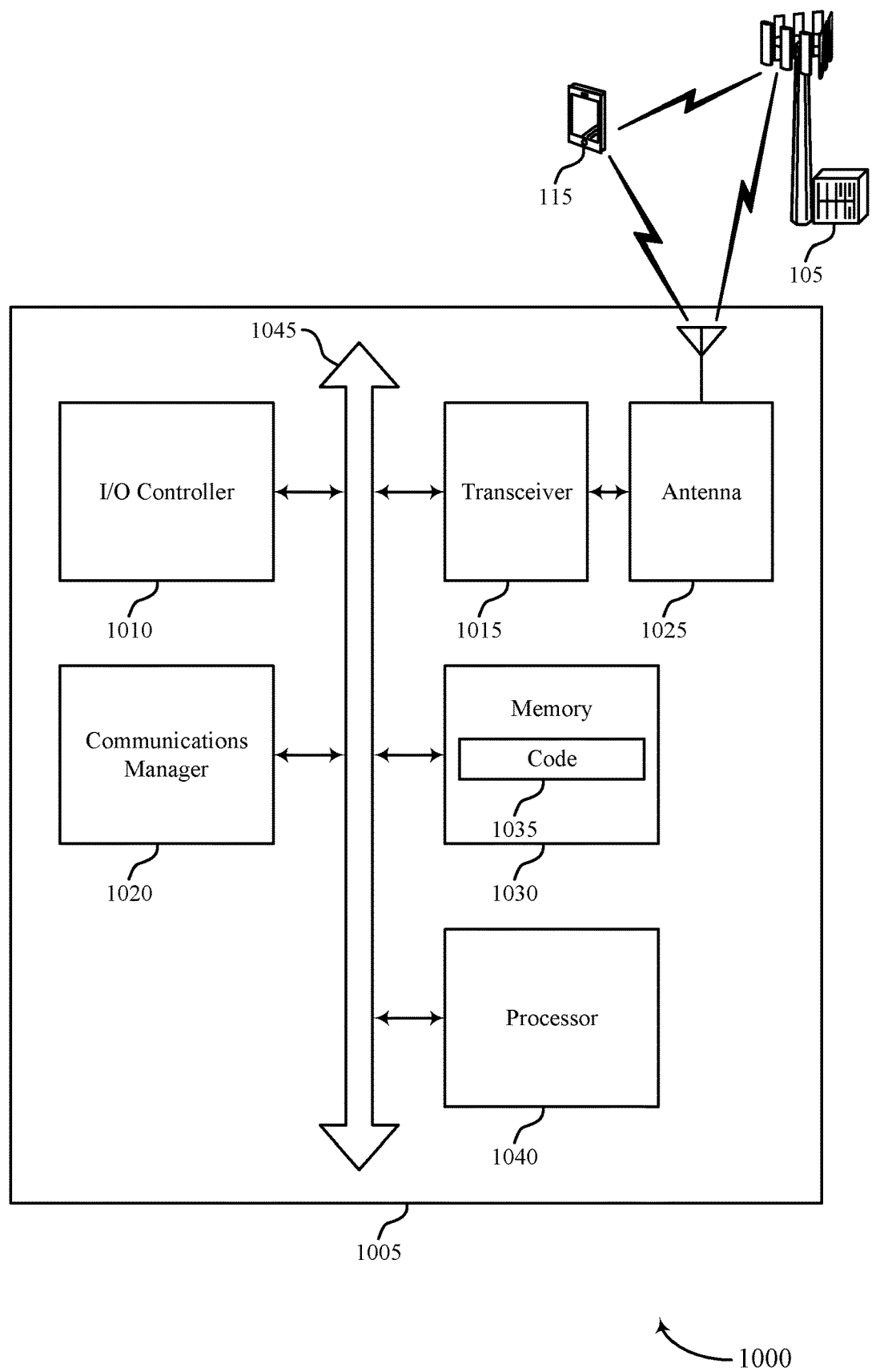
FIG. 10 shows a diagram of a system including a device that supports techniques for skipping scheduling requests in accordance with aspects of the present disclosure.

FIG. 10 shows a diagram of a system 1000 including a device 1005 that supports techniques for skipping scheduling requests in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for skipping scheduling requests). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 (e.g., a UE 115) in accordance with examples as disclosed herein. For example, the communications manager 1020 may be configured as or otherwise support a means for identifying that uplink data is available for transmission at the device 1005 prior to a scheduling request occasion. The communications manager 1020 may be configured as or otherwise support a means for skipping, during the scheduling request occasion, transmission of a scheduling request for requesting resources to use for transmission of the uplink data based on identifying that an uplink grant is pending. The communications manager 1020 may be configured as or otherwise support a means for transmitting, to a base station, at least a portion of the uplink data using a resource allocation indicated by the uplink grant.

Additionally or alternatively, the communications manager 1020 may support wireless communications at the device 1005 in accordance with examples as disclosed herein. For example, the communications manager 1020 may be configured as or otherwise support a means for transmitting, to a base station during a first scheduling request occasion, a scheduling request for requesting a grant that provides a resource allocation for uplink transmission. The communications manager 1020 may be configured as or otherwise support a means for initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. The communications manager 1020 may be configured as or otherwise support a means for skipping retransmission of the scheduling request during a second scheduling request occasion that is subsequent to the first scheduling request occasion based on the scheduling request retransmission timer.

By including or configuring the communications manager 1020 in accordance with examples as described herein, the device 1005 may support techniques for improved user experience. For example, the techniques described herein may enable the device 1005 to attain greater power savings and longer battery life by reducing a number of scheduling request transmissions performed by the device 1005. As a result, the device 1005 may experience reduced power consumption and longer battery life, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for skipping scheduling requests as described herein, or the processor 1040 and the memory 1030 may be otherwise configured to perform or support such operations.

Figure 11:
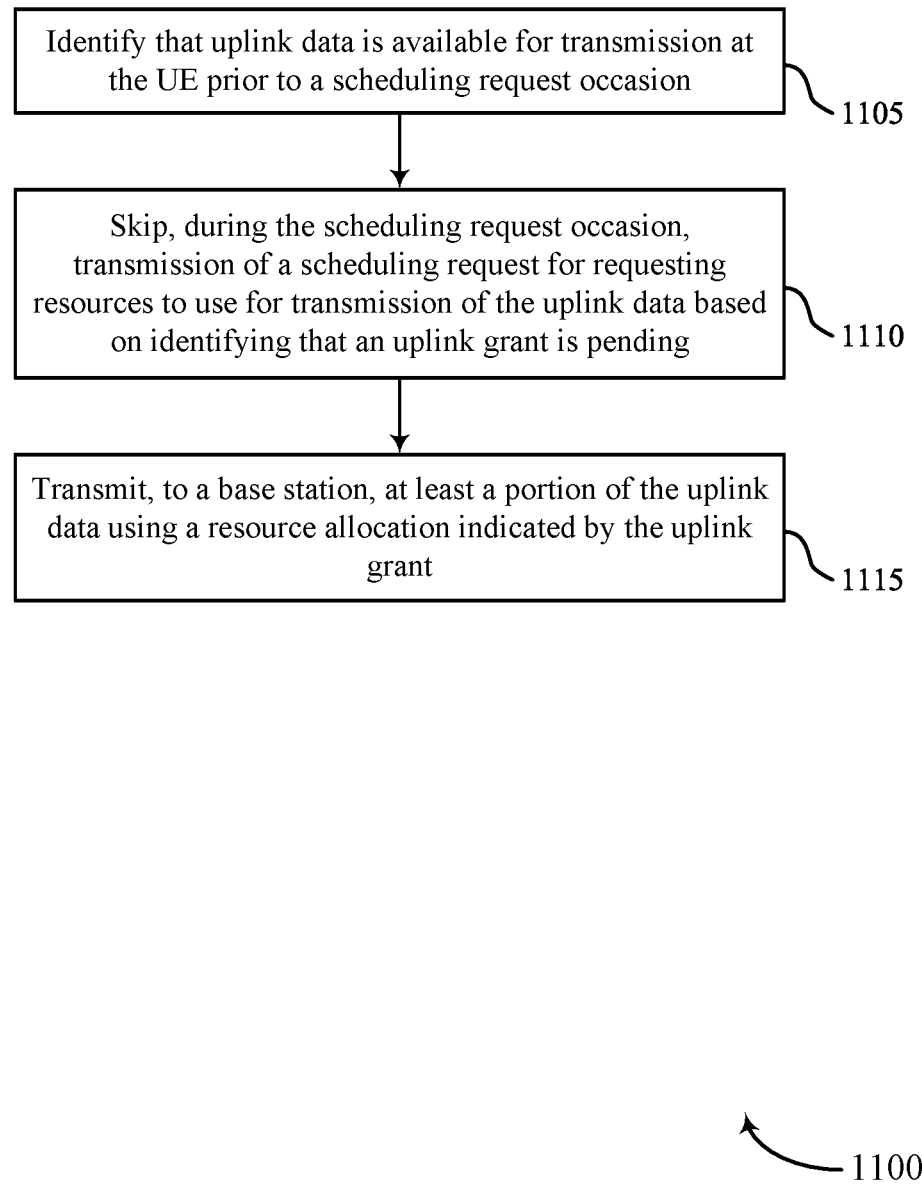
FIGS. 11 through 14 show flowcharts illustrating methods that support techniques for skipping scheduling requests in accordance with aspects of the present disclosure.

FIG. 11 shows a flowchart illustrating a method 1100 that supports techniques for skipping scheduling requests in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include identifying that uplink data is available for transmission at the UE prior to a scheduling request occasion. The operations of 1105 may be performed in accordance with examples as disclosed herein. In some examples, aspects of the operations of 1105 may be performed by a data arrival component 925 as described with reference to FIG. 9.

At 1110, the method may include skipping, during the scheduling request occasion, transmission of a scheduling request for requesting resources to use for transmission of the uplink data based on identifying that an uplink grant is pending. The operations of 1110 may be performed in accordance with examples as disclosed herein. In some examples, aspects of the operations of 1110 may be performed by a transmission skipping component 930 as described with reference to FIG. 9.

At 1115, the method may include transmitting, to a base station, at least a portion of the uplink data using a resource allocation indicated by the uplink grant. The operations of 1115 may be performed in accordance with examples as disclosed herein. In some examples, aspects of the operations of 1115 may be performed by an uplink data transmitting component 935 as described with reference to FIG. 9.

Figure 12:
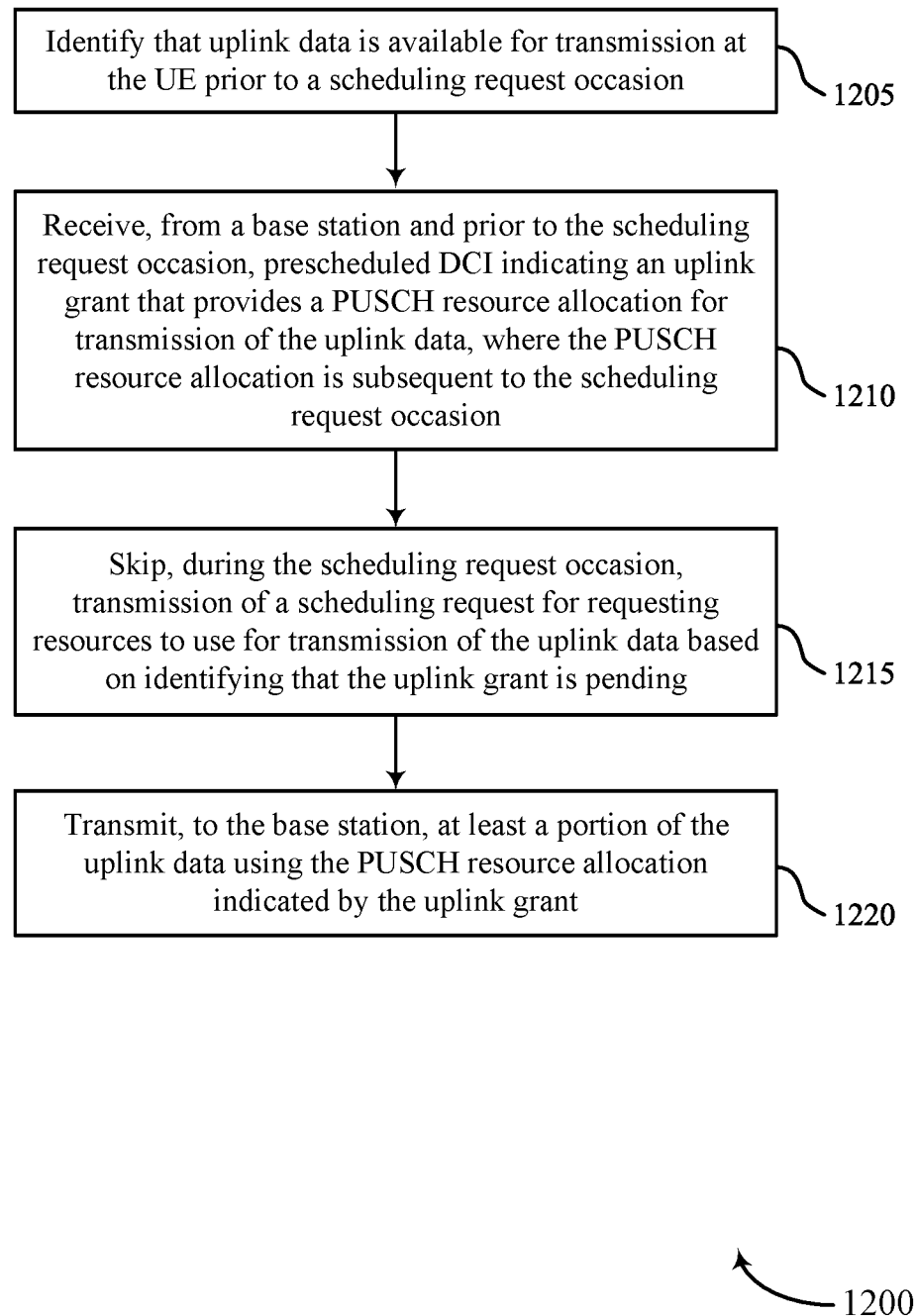

FIG. 12 shows a flowchart illustrating a method 1200 that supports techniques for skipping scheduling requests in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include identifying that uplink data is available for transmission at the UE prior to a scheduling request occasion. The operations of 1205 may be performed in accordance with examples as disclosed herein. In some examples, aspects of the operations of 1205 may be performed by a data arrival component 925 as described with reference to FIG. 9.

At 1210, the method may include receiving, from a base station and prior to the scheduling request occasion, pre-scheduled DCI indicating an uplink grant that provides a PUSCH resource allocation for transmission of the uplink data, where the PUSCH resource allocation is subsequent to the scheduling request occasion. The operations of 1210 may be performed in accordance with examples as disclosed herein. In some examples, aspects of the operations of 1210 may be performed by an uplink grant receiving component 950 as described with reference to FIG. 9.

At 1215, the method may include skipping, during the scheduling request occasion, transmission of a scheduling request for requesting resources to use for transmission of the uplink data based on identifying that the uplink grant is pending. The operations of 1215 may be performed in accordance with examples as disclosed herein. In some examples, aspects of the operations of 1215 may be performed by a transmission skipping component 930 as described with reference to FIG. 9.

At 1220, the method may include transmitting, to the base station, at least a portion of the uplink data using the PUSCH resource allocation indicated by the uplink grant. The operations of 1220 may be performed in accordance with examples as disclosed herein. In some examples, aspects of the operations of 1220 may be performed by an uplink data transmitting component 935 as described with reference to FIG. 9.

Figure 13:
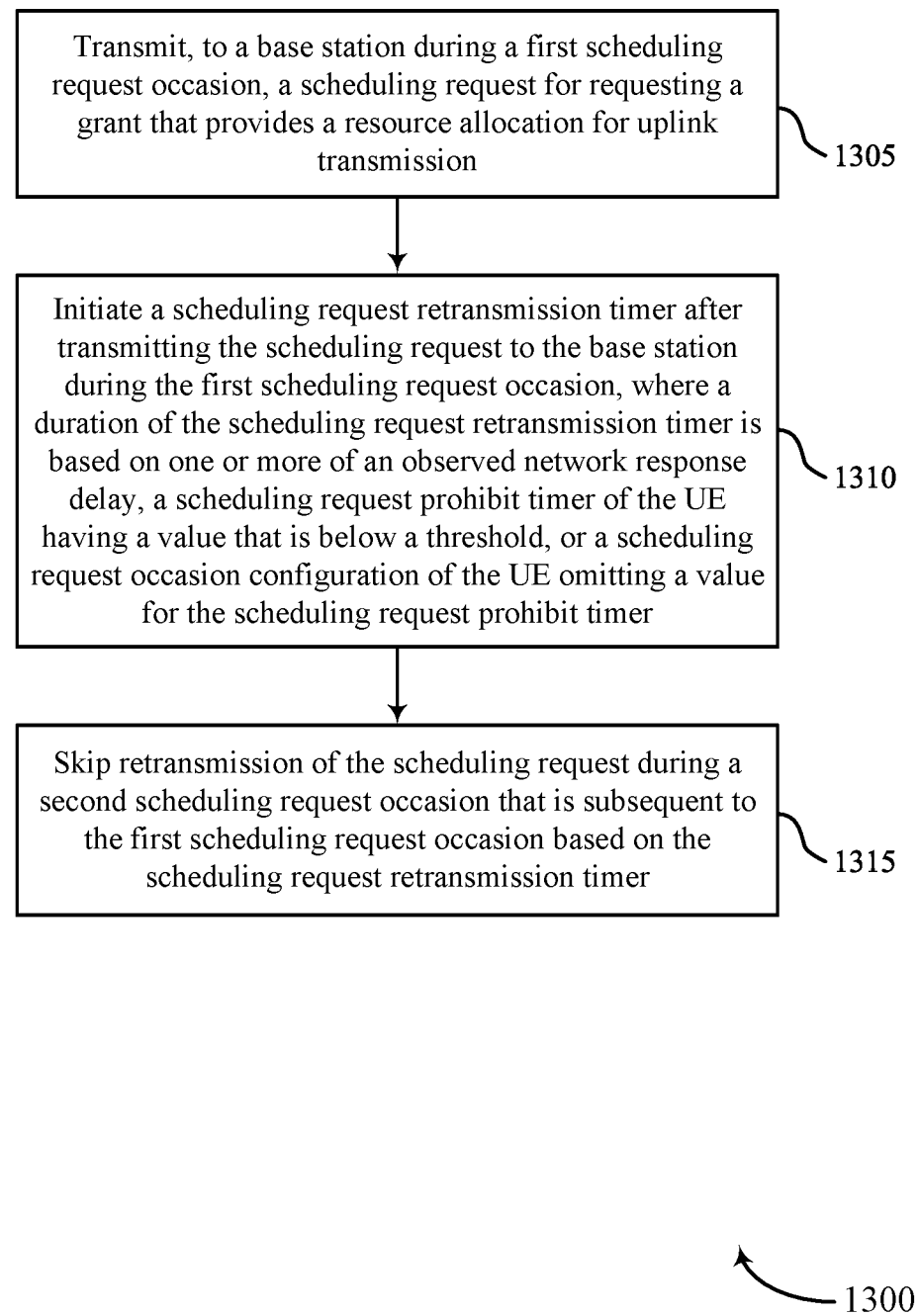

FIG. 13 shows a flowchart illustrating a method 1300 that supports techniques for skipping scheduling requests in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station during a first scheduling request occasion, a scheduling request for requesting a grant that provides a resource allocation for uplink transmission. The operations of 1305 may be performed in accordance with examples as disclosed herein. In some examples, aspects of the operations of 1305 may be performed by a scheduling request transmitting component 940 as described with reference to FIG. 9.

At 1310, the method may include initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. The operations of 1310 may be performed in accordance with examples as disclosed herein. In some examples, aspects of the operations of 1310 may be performed by a timer initiating component 945 as described with reference to FIG. 9.

At 1315, the method may include skipping retransmission of the scheduling request during a second scheduling request occasion that is subsequent to the first scheduling request occasion based on the scheduling request retransmission timer. The operations of 1315 may be performed in accordance with examples as disclosed herein. In some examples, aspects of the operations of 1315 may be performed by a transmission skipping component 930 as described with reference to FIG. 9.

Figure 14:
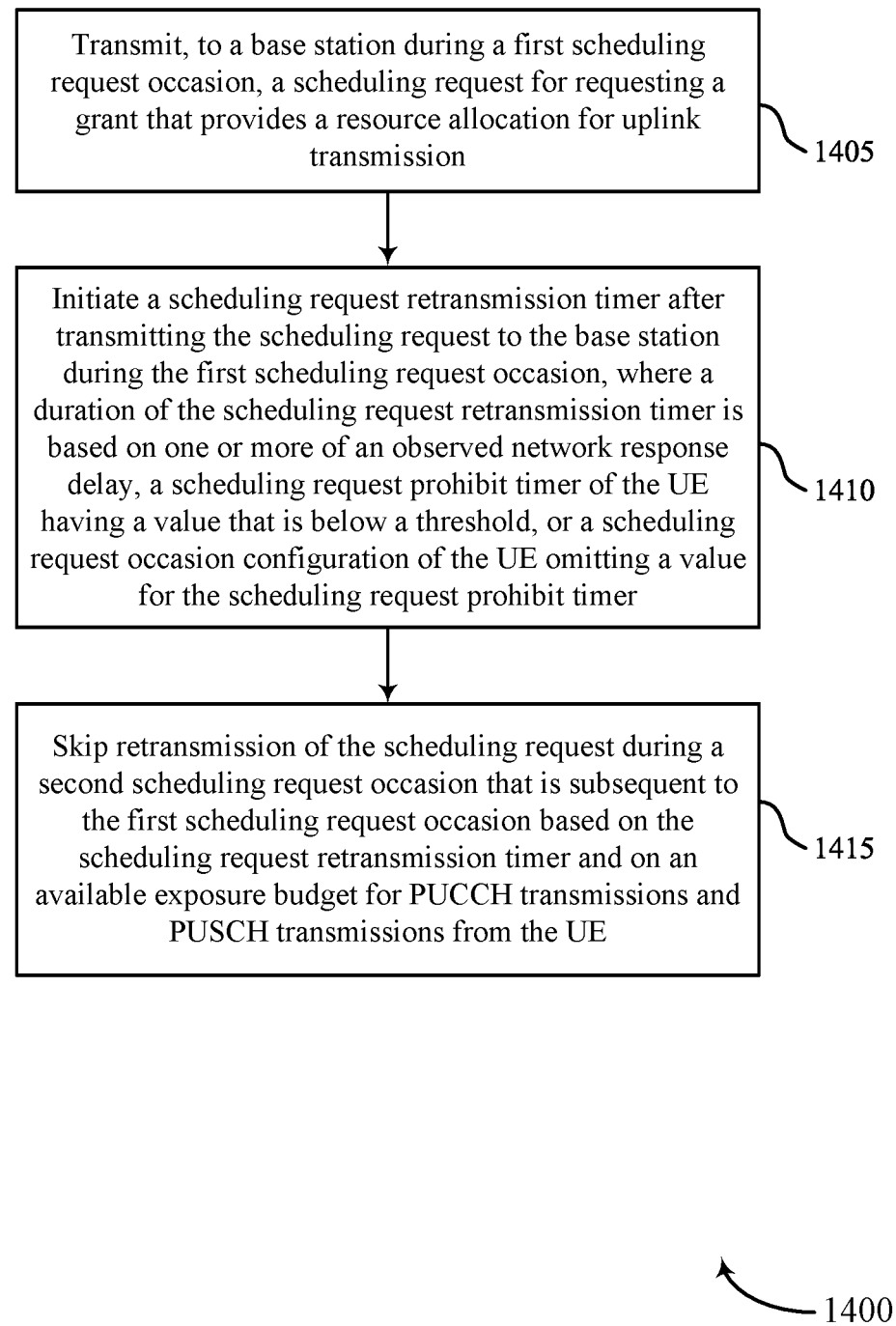

FIG. 14 shows a flowchart illustrating a method 1400 that supports techniques for skipping scheduling requests in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station during a first scheduling request occasion, a scheduling request for requesting a grant that provides a resource allocation for uplink transmission. The operations of 1405 may be performed in accordance with examples as disclosed herein. In some examples, aspects of the operations of 1405 may be performed by a scheduling request transmitting component 940 as described with reference to FIG. 9.

At 1410, the method may include initiating a scheduling request retransmission timer after transmitting the scheduling request to the base station during the first scheduling request occasion, where a duration of the scheduling request retransmission timer is based on one or more of an observed network response delay, a scheduling request prohibit timer of the UE having a value that is below a threshold, or a scheduling request occasion configuration of the UE omitting a value for the scheduling request prohibit timer. The operations of 1410 may be performed in accordance with examples as disclosed herein. In some examples, aspects of the operations of 1410 may be performed by a time determining component 960 as described with reference to FIG. 9.

At 1415, the method may include skipping retransmission of the scheduling request during a second scheduling request occasion that is subsequent to the first scheduling request occasion based on the scheduling request retransmission timer and on an available exposure budget for PUCCH transmissions and PUSCH transmissions from the UE. The operations of 1415 may be performed in accordance with examples as disclosed herein. In some examples, aspects of the operations of 1415 may be performed by a timer initiating component 945 as described with reference to FIG. 9.

The following provides an overview of aspects of the present disclosure:

Aspect 1: A method for wireless communications at a UE, comprising: identifying that uplink data is available for transmission at the UE prior to a scheduling request occasion; skipping, during the scheduling request occasion, transmission of a scheduling request for requesting resources to use for transmission of the uplink data based at least in part on identifying that an uplink grant is pending; and transmitting, to a base station, at least a portion of the uplink data using a resource allocation indicated by the uplink grant.

Aspect 2: The method of aspect 1, wherein transmitting at least the portion of the uplink data comprises: transmitting at least the portion of the uplink data to the base station using the resource allocation indicated by the uplink grant that occurs subsequent to the scheduling request occasion.

Aspect 3: The method of any of aspects 1 through 2, further comprising: triggering the scheduling request based at least in part on identifying that the uplink data is available for transmission; receiving the uplink grant from the base station after triggering the scheduling request and before the scheduling request occasion; and canceling the scheduling request based at least in part on receiving the uplink grant.

Aspect 4: The method of any of aspects 1 through 3, further comprising: transmitting an initial scheduling request to the base station during a scheduling request occasion that occurs prior to the scheduling request occasion based at least in part on identifying that the uplink data is available for transmission at the UE; and receiving the uplink grant from the base station in response to transmitting the initial scheduling request, wherein skipping transmission of the scheduling request is based at least in part on receiving the uplink grant from the base station.

Aspect 5: The method of any of aspects 1 through 4, further comprising: receiving, from the base station and prior to the scheduling request occasion, prescheduled downlink control information indicating the uplink grant that provides a physical uplink shared channel resource allocation for transmission of the uplink data, wherein the physical uplink shared channel resource allocation is subsequent to the scheduling request occasion.

Aspect 6: The method of any of aspects 1 through 5, further comprising: receiving, from the base station, downlink control information indicating the uplink grant, wherein skipping transmission of the scheduling request is based at least in part on receiving the downlink control information from the base station.

Aspect 7: The method of any of aspects 1 through 6, further comprising: receiving, from the base station, the uplink grant indicating a set of physical uplink shared channel resources allocated for transmission of the uplink data.

Aspect 8: The method of any of aspects 1 through 7, further comprising: receiving a second uplink grant from the base station; and transmitting a remainder of the uplink data to the base station on a second resource allocation indicated by the second uplink grant.

Aspect 9: The method of any of aspects 1 through 8, wherein skipping transmission of the scheduling request comprises: skipping transmission of the scheduling request during the scheduling request occasion based at least in part on a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof.

Aspect 10: The method of aspect 9, further comprising: determining that a summation of the delay between scheduling request transmission and uplink grant reception and a difference between the first time and the second time is greater than a difference between the third time and the first time, wherein skipping transmission of the scheduling request is based at least in part on the determining.

Aspect 11: A method for wireless communications at a UE, comprising: transmitting, to a base station during a first scheduling request occasion, a scheduling request for requesting a grant that provides a resource allocation for uplink transmission; initiating a scheduling request retransmission timer after transmitting the scheduling request to the base station during the first scheduling request occasion, wherein a duration of the scheduling request retransmission timer is based at least in part on one or more of an observed network response delay, a scheduling request prohibit timer of the UE having a value that is below a threshold, or a scheduling request occasion configuration of the UE omitting a value for the scheduling request prohibit timer; and skipping retransmission of the scheduling request during a second scheduling request occasion that is subsequent to the first scheduling request occasion based at least in part on the scheduling request retransmission timer.

Aspect 12: The method of aspect 11, further comprising: receiving control signaling indicating the scheduling request occasion configuration, wherein the duration of the scheduling request retransmission timer is set based at least in part on the scheduling request occasion configuration omitting a value for the scheduling request prohibit timer that allows the base station to respond to the scheduling request.

Aspect 13: The method of any of aspects 11 through 12, further comprising: determining the duration of the scheduling request retransmission timer based at least in part on one or both of a scheduling request occasion periodicity of the base station or the observed network response delay that is a minimum network response delay observed by the UE of the base station responding to one or more prior scheduling requests, wherein skipping retransmission of the scheduling request is based at least in part on determining the duration of the scheduling request retransmission timer.

Aspect 14: The method of any of aspects 11 through 13, further comprising: receiving the grant based at least in part on transmitting the scheduling request during the first scheduling request occasion; and transmitting one or both of a buffer status report or uplink data using the resource allocation provided by the grant.

Aspect 15: The method of any of aspects 11 through 14, wherein transmitting the scheduling request during the first scheduling request occasion comprises: transmitting the scheduling request on one or more physical uplink control channel resources during the first scheduling request occasion.

Aspect 16: The method of any of aspects 11 through 15, wherein skipping retransmission of the scheduling request comprises: skipping retransmission of the scheduling request during the second scheduling request occasion based at least in part on an available exposure budget for physical uplink control channel transmissions and physical uplink shared channel transmissions from the UE.

Aspect 17: An apparatus for wireless communications at a UE, comprising a processor; memory coupled with the processor; and instructions stored in the memory and executable by the processor to cause the apparatus to perform a method of any of aspects 1 through 10.

Aspect 18: An apparatus for wireless communications at a UE, comprising at least one means for performing a method of any of aspects 1 through 10.

Aspect 19: A non-transitory computer-readable medium storing code for wireless communications at a UE, the code comprising instructions executable by a processor to perform a method of any of aspects 1 through 10.

Aspect 20: An apparatus for wireless communications at a UE, comprising a processor; memory coupled with the processor; and instructions stored in the memory and executable by the processor to cause the apparatus to perform a method of any of aspects 11 through 16.

Aspect 21: An apparatus for wireless communications at a UE, comprising at least one means for performing a method of any of aspects 11 through 16.

Aspect 22: A non-transitory computer-readable medium storing code for wireless communications at a UE, the code comprising instructions executable by a processor to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying that uplink data is available for transmission at the UE prior to a scheduling request occasion;
   skipping, during the scheduling request occasion, transmission of a scheduling request for requesting resources to use for transmission of the uplink data based at least in part on identifying that an uplink grant is pending, wherein skipping transmission of the scheduling request is based at least in part on: a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof;
   determining that a summation of the delay between scheduling request transmission and uplink grant reception and a difference between the first time and the second time is greater than a difference between the third time and the first time, wherein skipping transmission of the scheduling request is based at least in part on the determining; and
   transmitting, to a base station, at least a portion of the uplink data using a resource allocation indicated by the uplink grant.

2. The method of claim 1, wherein transmitting at least the portion of the uplink data comprises:

transmitting at least the portion of the uplink data to the base station using the resource allocation indicated by the uplink grant that occurs subsequent to the scheduling request occasion.

3. The method of claim 1, further comprising:
triggering the scheduling request based at least in part on identifying that the uplink data is available for transmission;
receiving the uplink grant from the base station after triggering the scheduling request and before the scheduling request occasion; and
canceling the scheduling request based at least in part on receiving the uplink grant.

4. The method of claim 1, further comprising:
transmitting an initial scheduling request to the base station during a scheduling request occasion that occurs prior to the scheduling request occasion based at least in part on identifying that the uplink data is available for transmission at the UE; and
receiving the uplink grant from the base station in response to transmitting the initial scheduling request, wherein skipping transmission of the scheduling request is based at least in part on receiving the uplink grant from the base station.

5. The method of claim 1, further comprising:
receiving, from the base station and prior to the scheduling request occasion, prescheduled downlink control information indicating the uplink grant that provides a physical uplink shared channel resource allocation for transmission of the uplink data, wherein the physical uplink shared channel resource allocation is subsequent to the scheduling request occasion.

6. The method of claim 1, further comprising:
receiving, from the base station, downlink control information indicating the uplink grant, wherein skipping transmission of the scheduling request is based at least in part on receiving the downlink control information from the base station.

7. The method of claim 1, further comprising:
receiving, from the base station, the uplink grant indicating a set of physical uplink shared channel resources allocated for transmission of the uplink data.

8. The method of claim 1, further comprising:
receiving a second uplink grant from the base station; and
transmitting a remainder of the uplink data to the base station on a second resource allocation indicated by the second uplink grant.

9. A user equipment (UE), comprising:
one or more memories storing processor-executable code; and
one or more processors coupled with the one or more memories and individually or collectively operable to execute the processor-executable code to cause the UE to:
identify that uplink data is available for transmission at the UE prior to a scheduling request occasion;
skip, during the scheduling request occasion, transmission of a scheduling request for requesting resources to use for transmission of the uplink data based at least in part on identifying that an uplink grant is pending, wherein transmission of the scheduling request is skipped based at least in part on: a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof;
determine that a summation of the delay between scheduling request transmission and uplink grant reception and a difference between the first time and the second time is greater than a difference between the third time and the first time, wherein skipping transmission of the scheduling request is based at least in part on the determining; and
transmit, to a base station, at least a portion of the uplink data using a resource allocation indicated by the uplink grant.

10. The UE of claim 9, wherein, to transmit at least the portion of the uplink data, the one or more processors are individually or collectively further operable to execute the processor-executable code to cause the UE to:
transmit at least the portion of the uplink data to the base station using the resource allocation indicated by the uplink grant that occurs subsequent to the scheduling request occasion.

11. The UE of claim 9, wherein the one or more processors are individually or collectively further operable to execute the processor-executable code to cause the UE to:
trigger the scheduling request based at least in part on identifying that the uplink data is available for transmission;
receive the uplink grant from the base station after triggering the scheduling request and before the scheduling request occasion; and
cancel the scheduling request based at least in part on receiving the uplink grant.

12. The UE of claim 9, wherein the one or more processors are individually or collectively further operable to execute the processor-executable code to cause the UE to:
transmit an initial scheduling request to the base station during a scheduling request occasion that occurs prior to the scheduling request occasion based at least in part on identifying that the uplink data is available for transmission at the UE; and
receive the uplink grant from the base station in response to transmitting the initial scheduling request, wherein skipping transmission of the scheduling request is based at least in part on receiving the uplink grant from the base station.

13. The UE of claim 9, wherein the one or more processors are individually or collectively further operable to execute the processor-executable code to cause the UE to:
receive, from the base station and prior to the scheduling request occasion, prescheduled downlink control information indicating the uplink grant that provides a physical uplink shared channel resource allocation for transmission of the uplink data, wherein the physical uplink shared channel resource allocation is subsequent to the scheduling request occasion.

14. The UE of claim 9, wherein the one or more processors are individually or collectively further operable to execute the processor-executable code to cause the UE to:
receive, from the base station, downlink control information indicating the uplink grant, wherein skipping transmission of the scheduling request is based at least in part on receiving the downlink control information from the base station.

15. The UE of claim 9, wherein the one or more processors are individually or collectively further operable to execute the processor-executable code to cause the UE to:
receive a second uplink grant from the base station; and transmit a remainder of the uplink data to the base station on a second resource allocation indicated by the second uplink grant.

16. A non-transitory computer-readable medium storing code for wireless communications at a user equipment (UE), the code comprising instructions executable by one or more processors to:
  identify that uplink data is available for transmission at the UE prior to a scheduling request occasion;
  skip, during the scheduling request occasion, transmission of a scheduling request for requesting resources to use for transmission of the uplink data based at least in part on identifying that an uplink grant is pending, wherein transmission of the scheduling request is skipped based at least in part on: a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof;
  determine that a summation of the delay between scheduling request transmission and uplink grant reception and a difference between the first time and the second time is greater than a difference between the third time and the first time, wherein skipping transmission of the scheduling request is based at least in part on the determining; and
  transmit, to a base station, at least a portion of the uplink data using a resource allocation indicated by the uplink grant.

17. The non-transitory computer-readable medium of claim 16, wherein the instructions to transmit at least the portion of the uplink data are executable by the one or more processors to:
  transmit at least the portion of the uplink data to the base station using the resource allocation indicated by the uplink grant that occurs subsequent to the scheduling request occasion.

18. The non-transitory computer-readable medium of claim 17, wherein the instructions are executable by the one or more processors to:
  trigger the scheduling request based at least in part on identifying that the uplink data is available for transmission;
  receive the uplink grant from the base station after triggering the scheduling request and before the scheduling request occasion; and
  cancel the scheduling request based at least in part on receiving the uplink grant.

19. The non-transitory computer-readable medium of claim 16, wherein the instructions are executable by the one or more processors to:
  transmit an initial scheduling request to the base station during a scheduling request occasion that occurs prior to the scheduling request occasion based at least in part on identifying that the uplink data is available for transmission at the UE; and
  receive the uplink grant from the base station in response to transmitting the initial scheduling request, wherein skipping transmission of the scheduling request is based at least in part on receiving the uplink grant from the base station.

20. The non-transitory computer-readable medium of claim 16, wherein the instructions are executable by the one or more processors to:
  receive, from the base station and prior to the scheduling request occasion, prescheduled downlink control information indicating the uplink grant that provides a physical uplink shared channel resource allocation for transmission of the uplink data, wherein the physical uplink shared channel resource allocation is subsequent to the scheduling request occasion.

21. The non-transitory computer-readable medium of claim 16, wherein the instructions are executable by the one or more processors to:
  receive, from the base station, downlink control information indicating the uplink grant, wherein skipping transmission of the scheduling request is based at least in part on receiving the downlink control information from the base station.

22. The non-transitory computer-readable medium of claim 16, wherein the instructions are executable by the one or more processors to:
  receive, from the base station, the uplink grant indicating a set of physical uplink shared channel resources allocated for transmission of the uplink data.

23. The non-transitory computer-readable medium of claim 16, wherein the instructions are executable by the one or more processors to:
  receive a second uplink grant from the base station; and
  transmit a remainder of the uplink data to the base station on a second resource allocation indicated by the second uplink grant.

24. An apparatus for wireless communications at a user equipment (UE), comprising:
  means for identifying that uplink data is available for transmission at the UE prior to a scheduling request occasion;
  means for skipping, during the scheduling request occasion, transmission of a scheduling request for requesting resources to use for transmission of the uplink data based at least in part on identifying that an uplink grant is pending, wherein transmission of the scheduling request is skipped based at least in part on: a determination that prescheduling is activated for the UE, a first time associated with the UE triggering the scheduling request, a second time associated with the scheduling request occasion, a third time associated with a prescheduled uplink grant monitoring occasion, a delay between scheduling request transmission and uplink grant reception, or a combination thereof;
  means for determining that a summation of the delay between scheduling request transmission and uplink grant reception and a difference between the first time and the second time is greater than a difference between the third time and the first time, wherein skipping transmission of the scheduling request is based at least in part on the determining; and
  means for transmitting, to a base station, at least a portion of the uplink data using a resource allocation indicated by the uplink grant.

25. The apparatus of claim 24, wherein the means for transmitting at least the portion of the uplink data comprises:
  means for transmitting at least the portion of the uplink data to the base station using the resource allocation indicated by the uplink grant that occurs subsequent to the scheduling request occasion.

* * * * *